A. H. SEGLER.
SHAFT CUTTING AND CENTERING MACHINE.
APPLICATION FILED JULY 18, 1919.

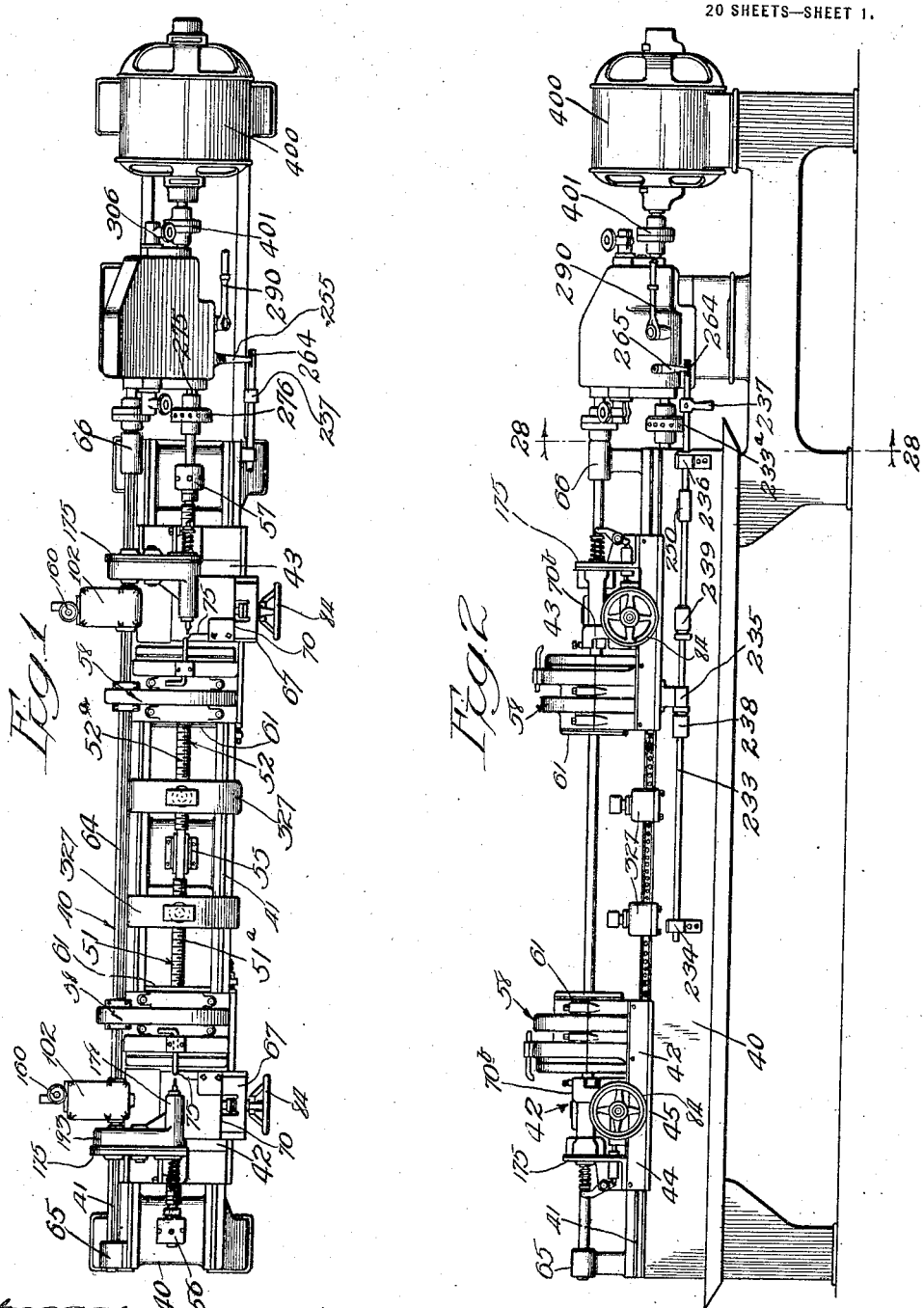

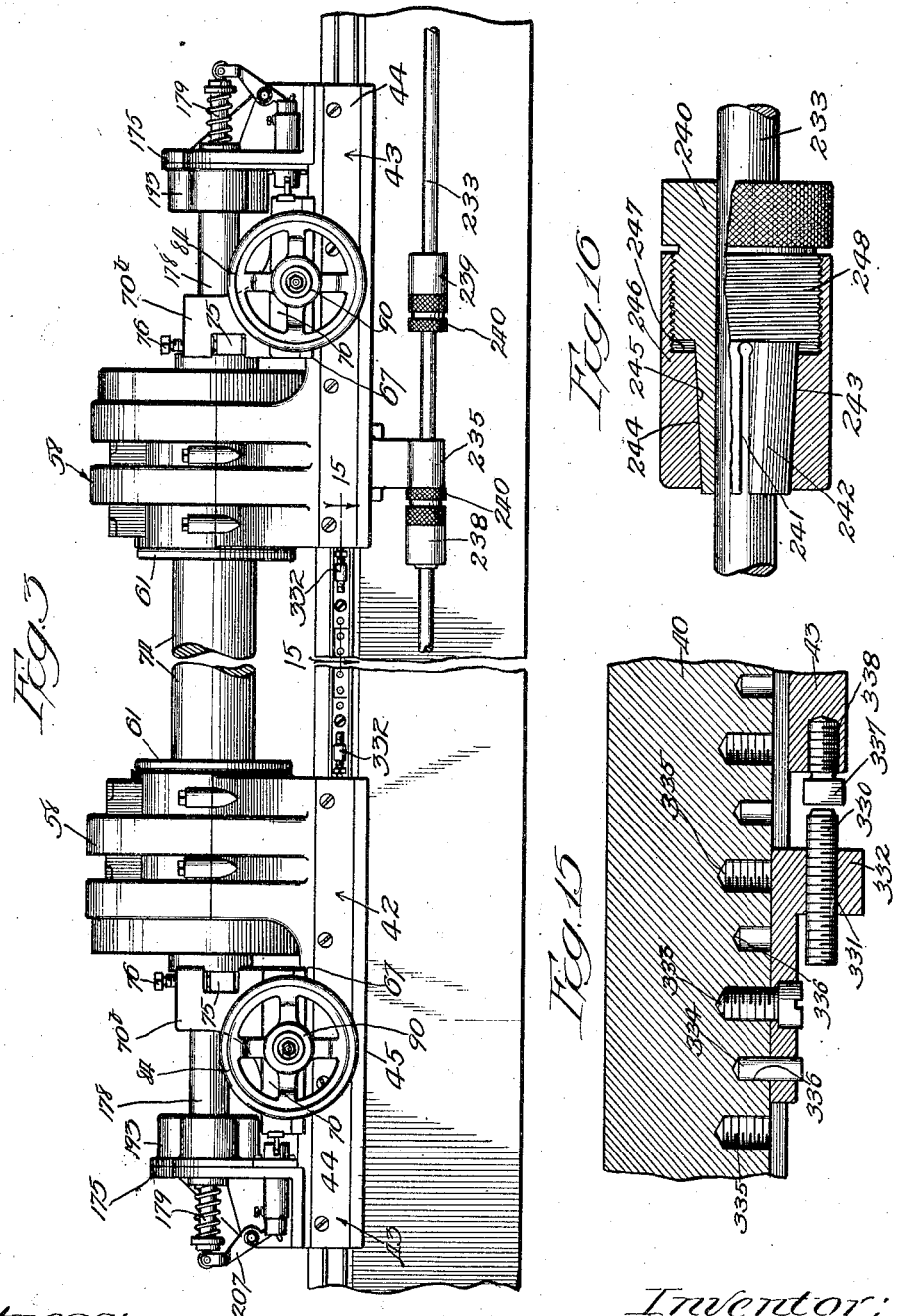

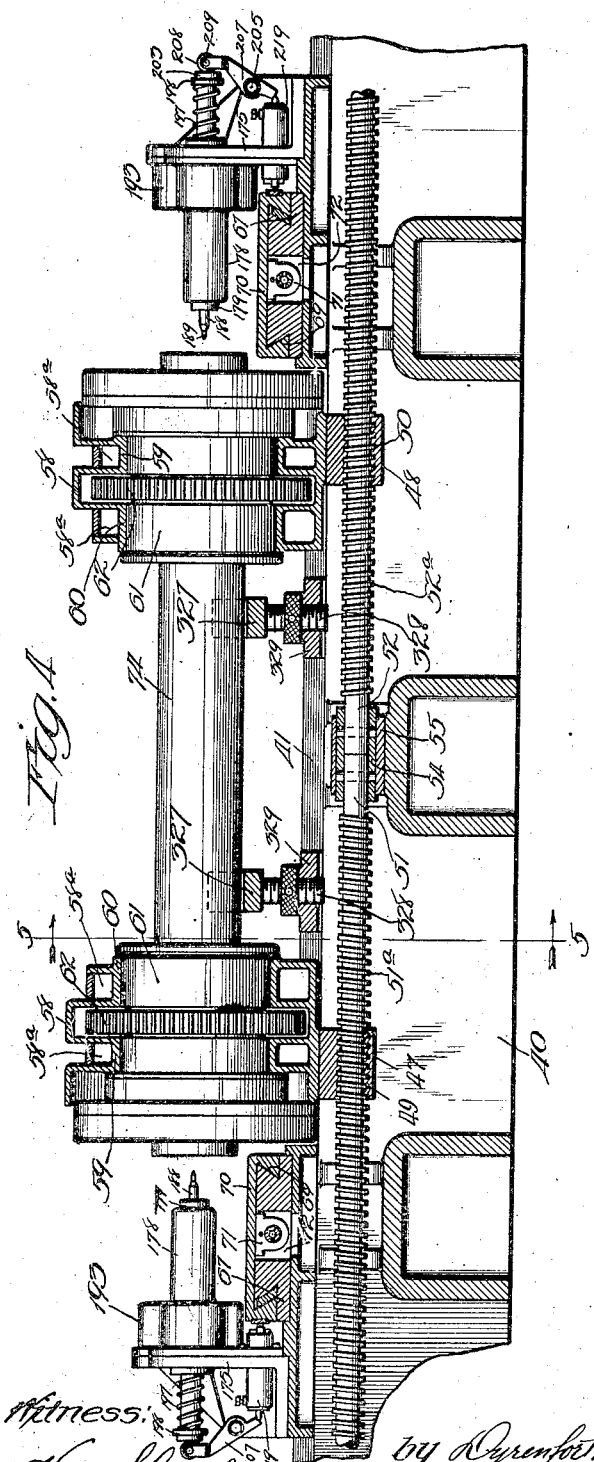
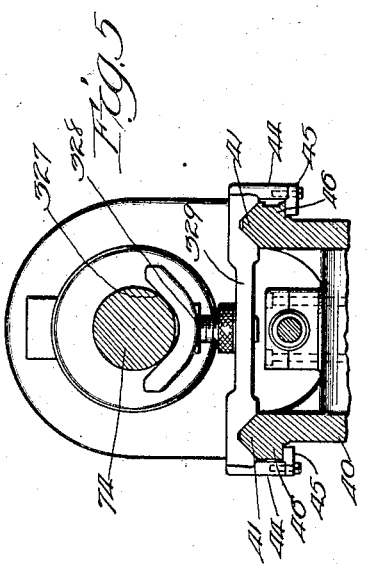

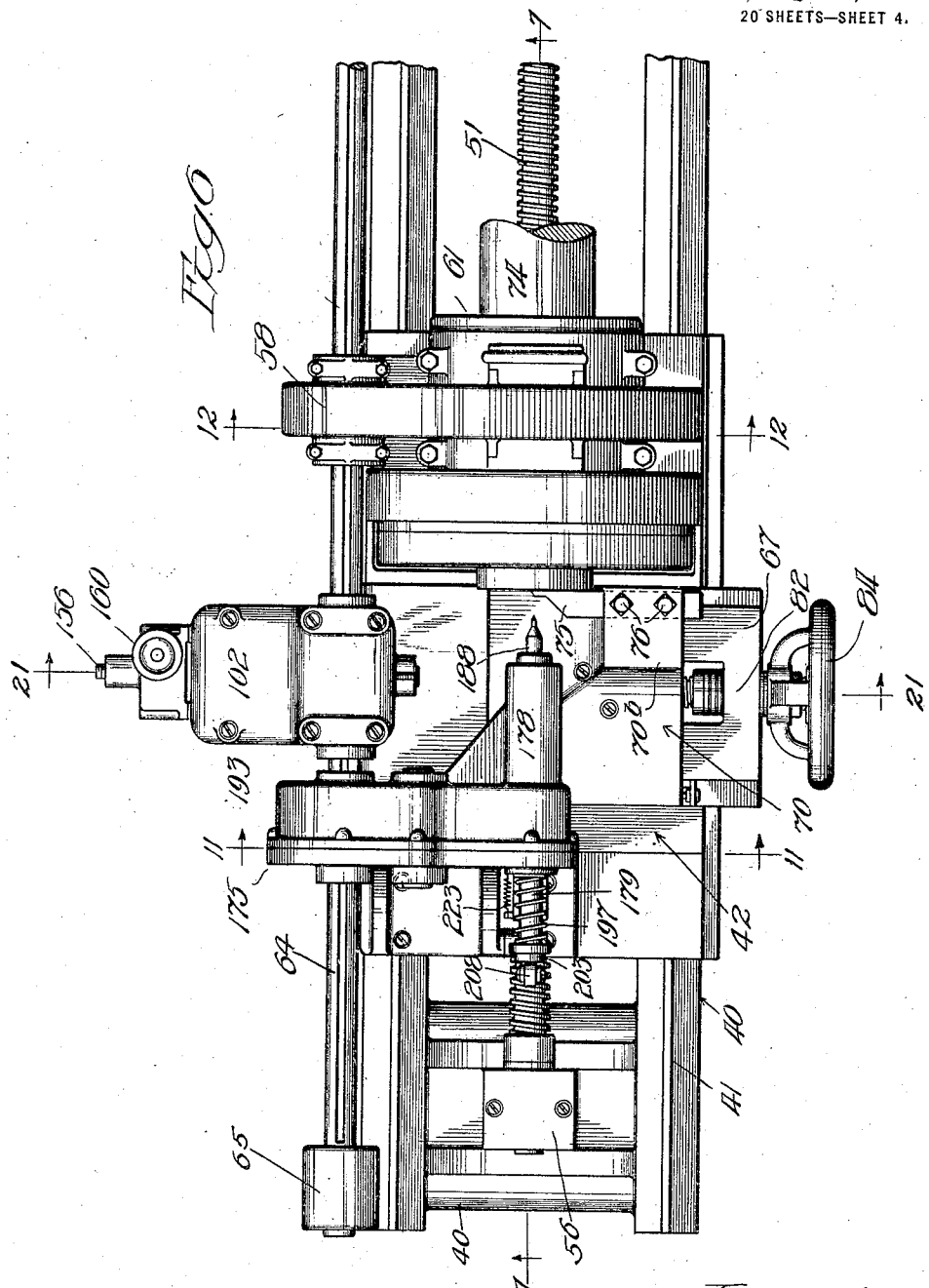

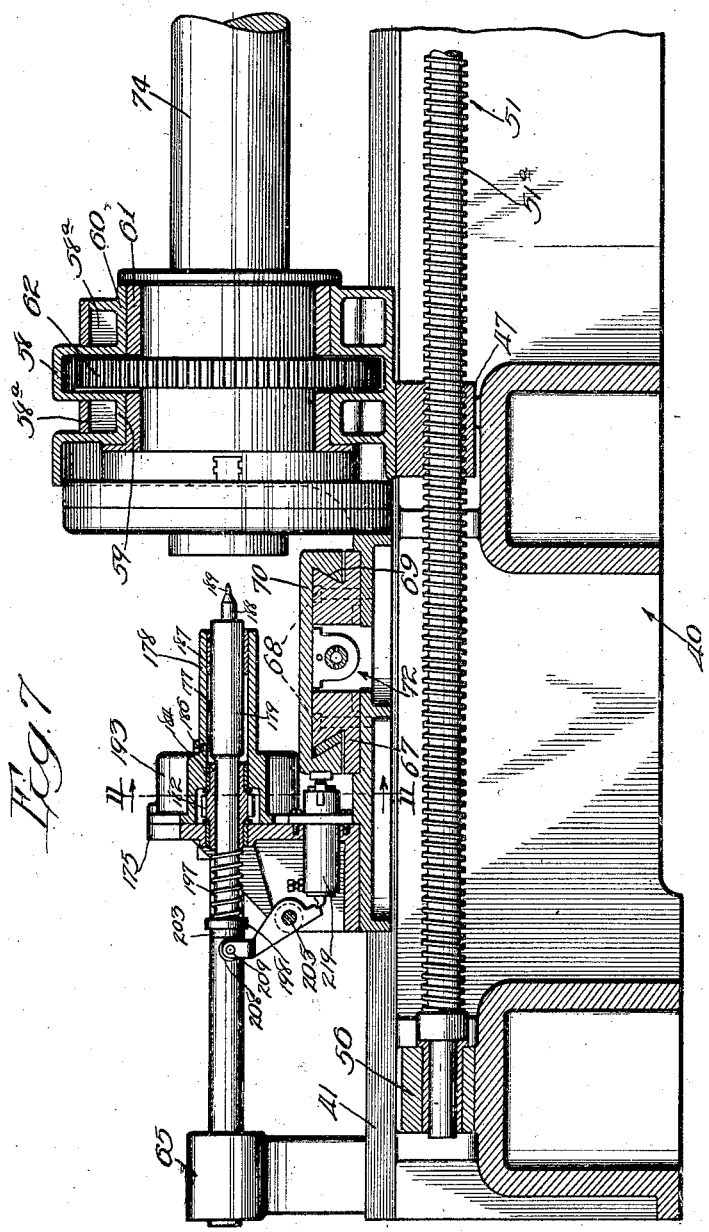

1,427,233.

Patented Aug. 29, 1922.
20 SHEETS—SHEET 6.

Witness:
Harry S. Gaither

Inventor:
Albert H. Segler
by Dyrenforth, Lee, Chritton & Wiles
Attys

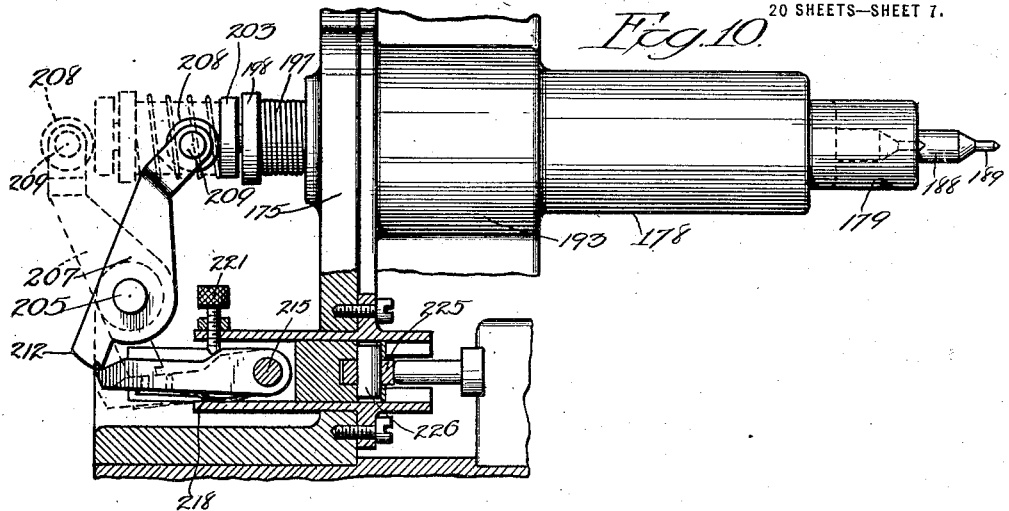
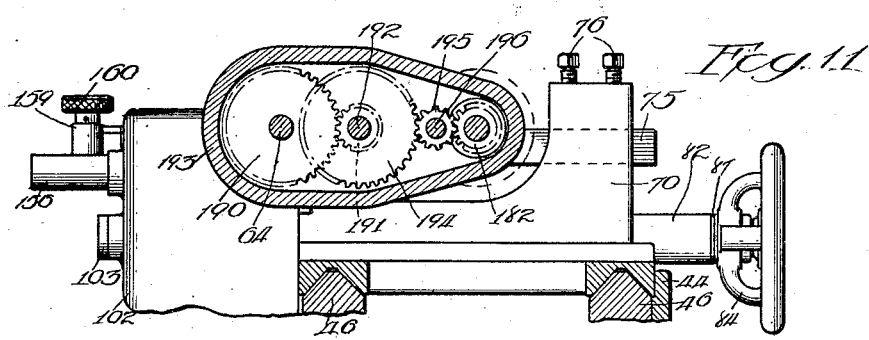
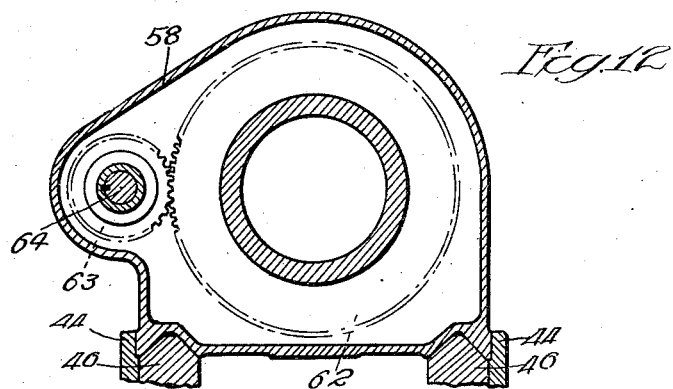

A. H. SEGLER.
SHAFT CUTTING AND CENTERING MACHINE.
APPLICATION FILED JULY 18, 1919.
1,427,233.  Patented Aug. 29, 1922.
20 SHEETS—SHEET 8.
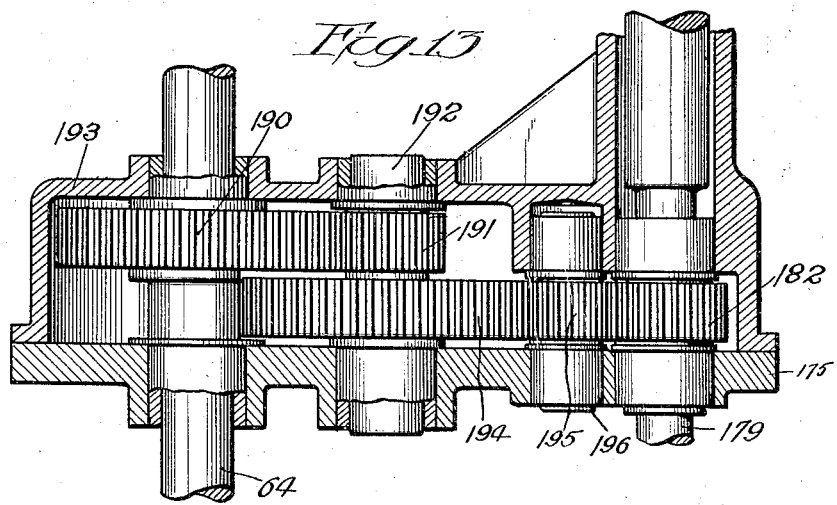
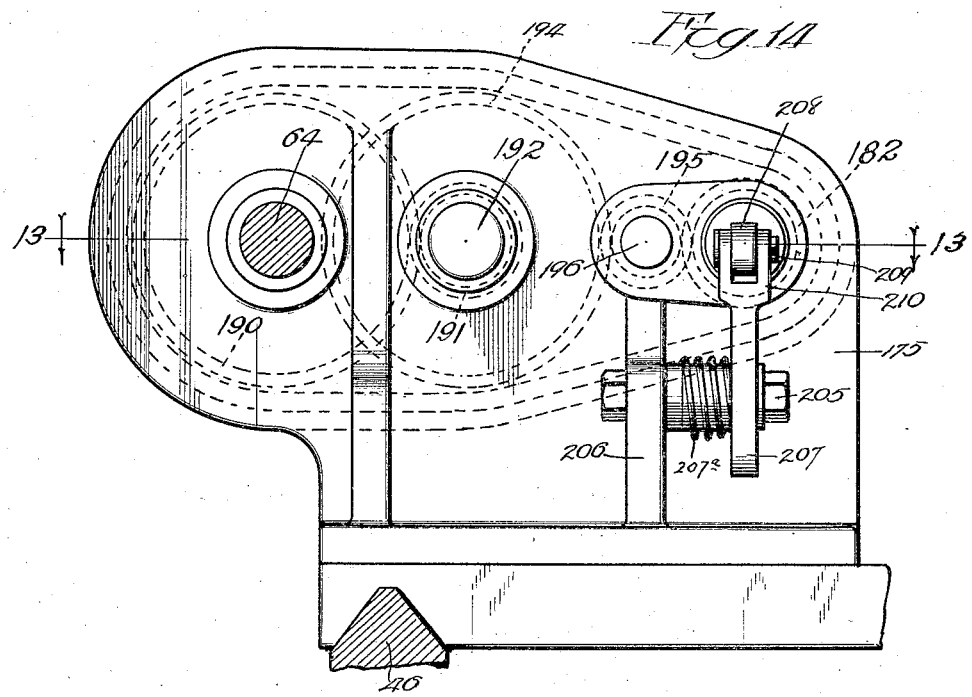
Witness:
Harry S. Gaither
Inventor:
Albert H. Segler
by Griffith, Lee, Britton and Niles
Attys

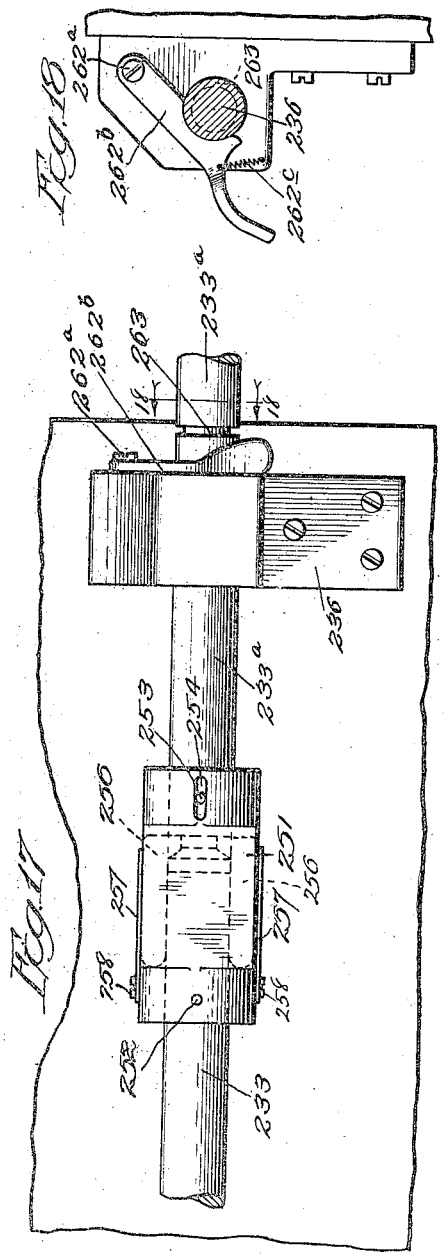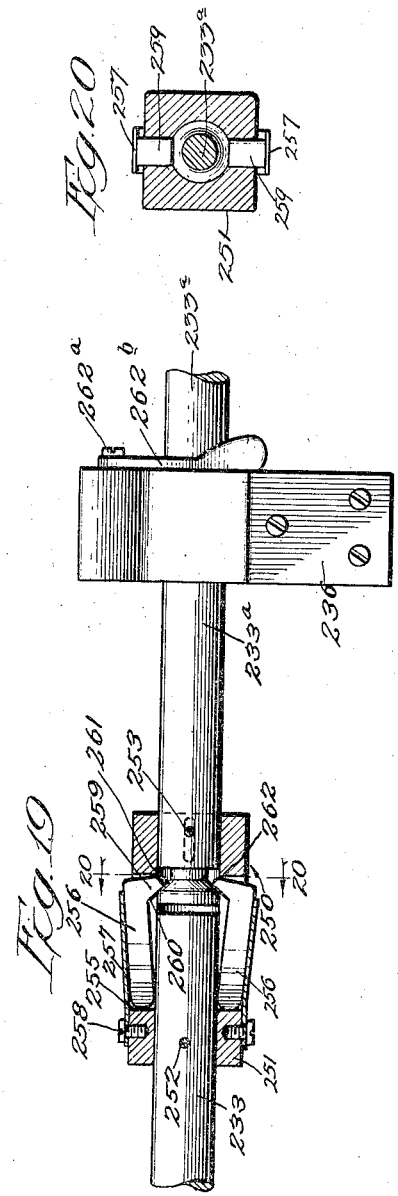

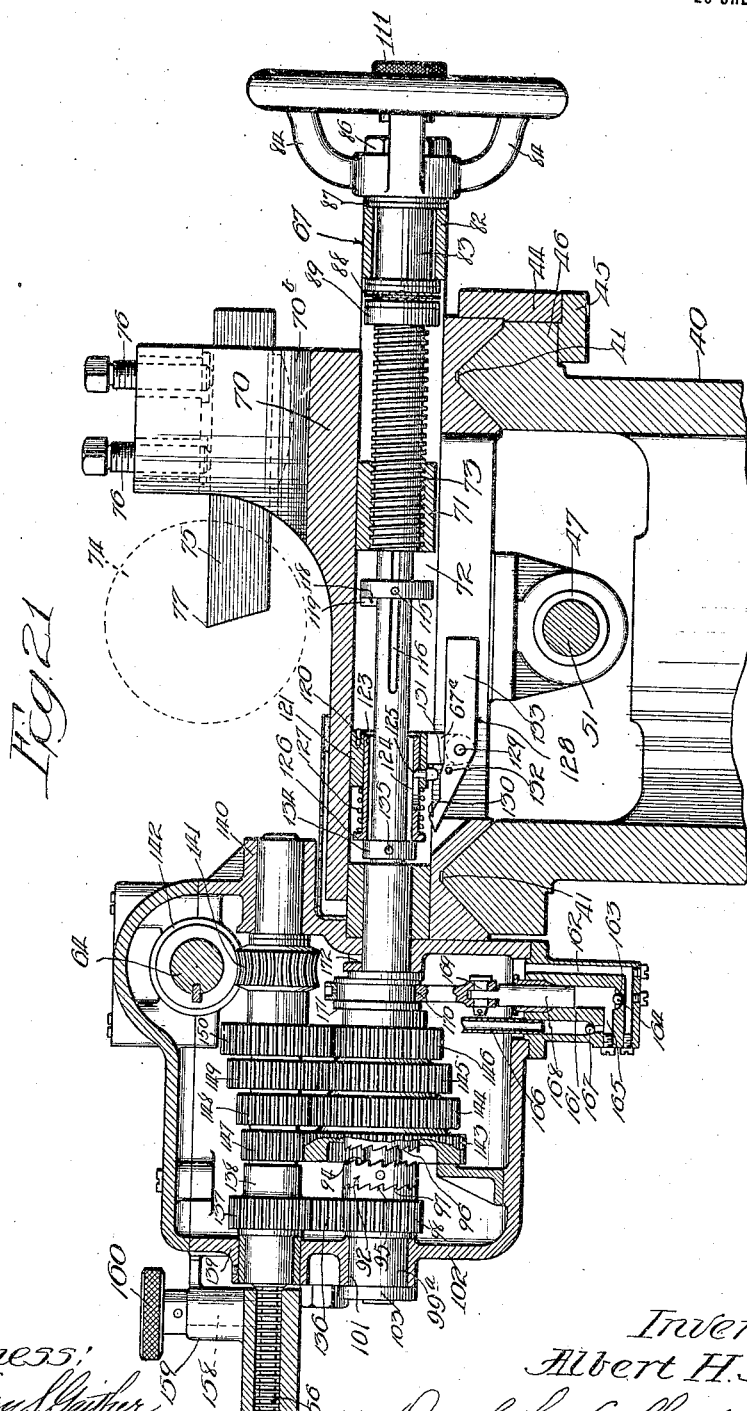

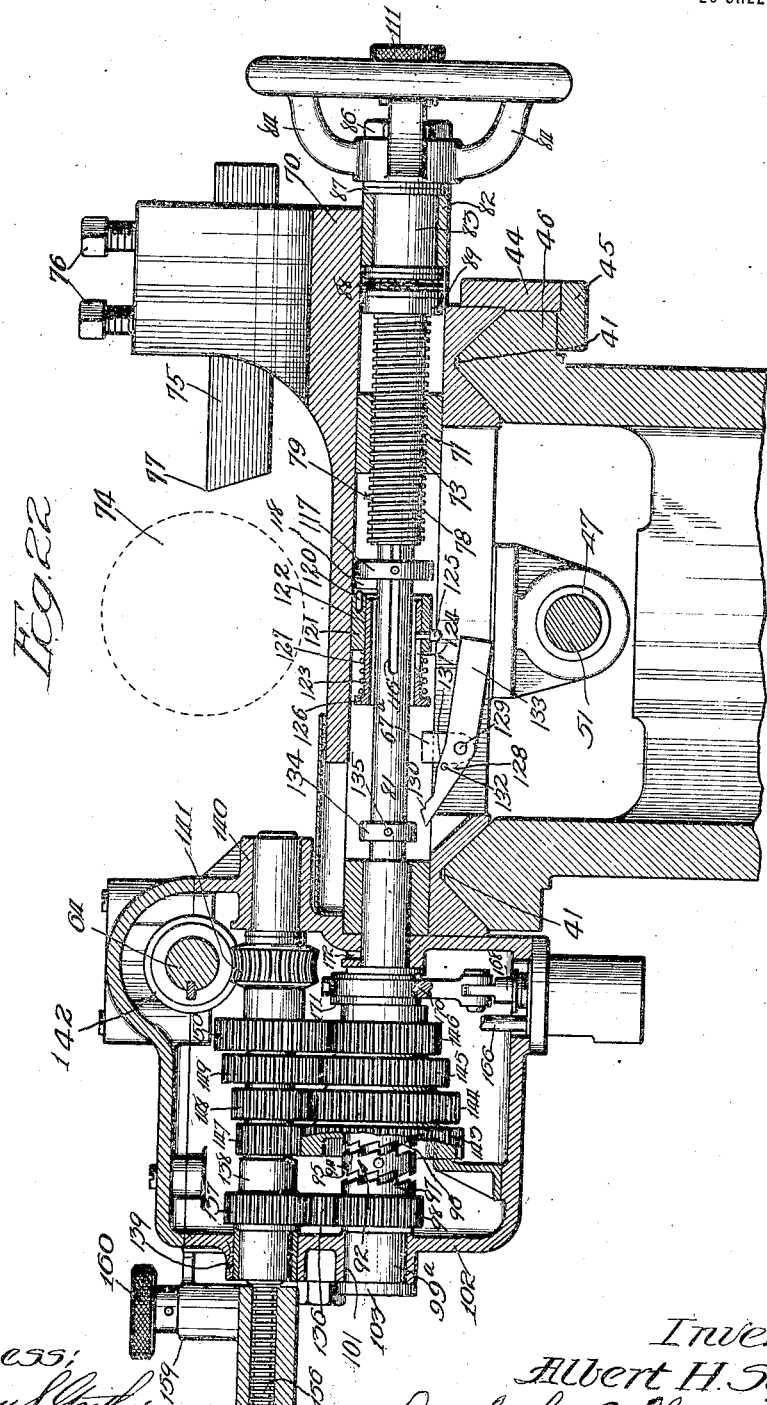

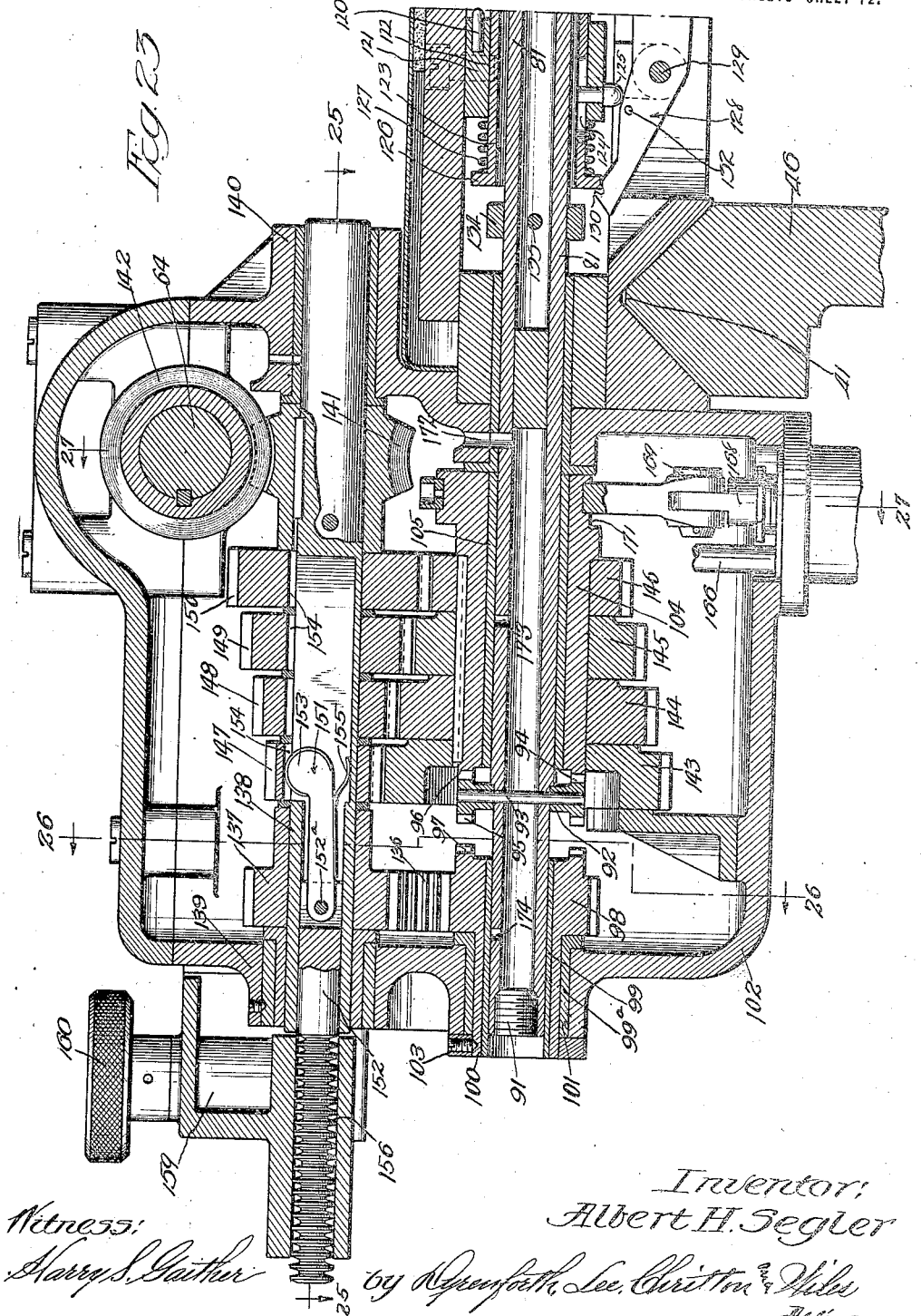

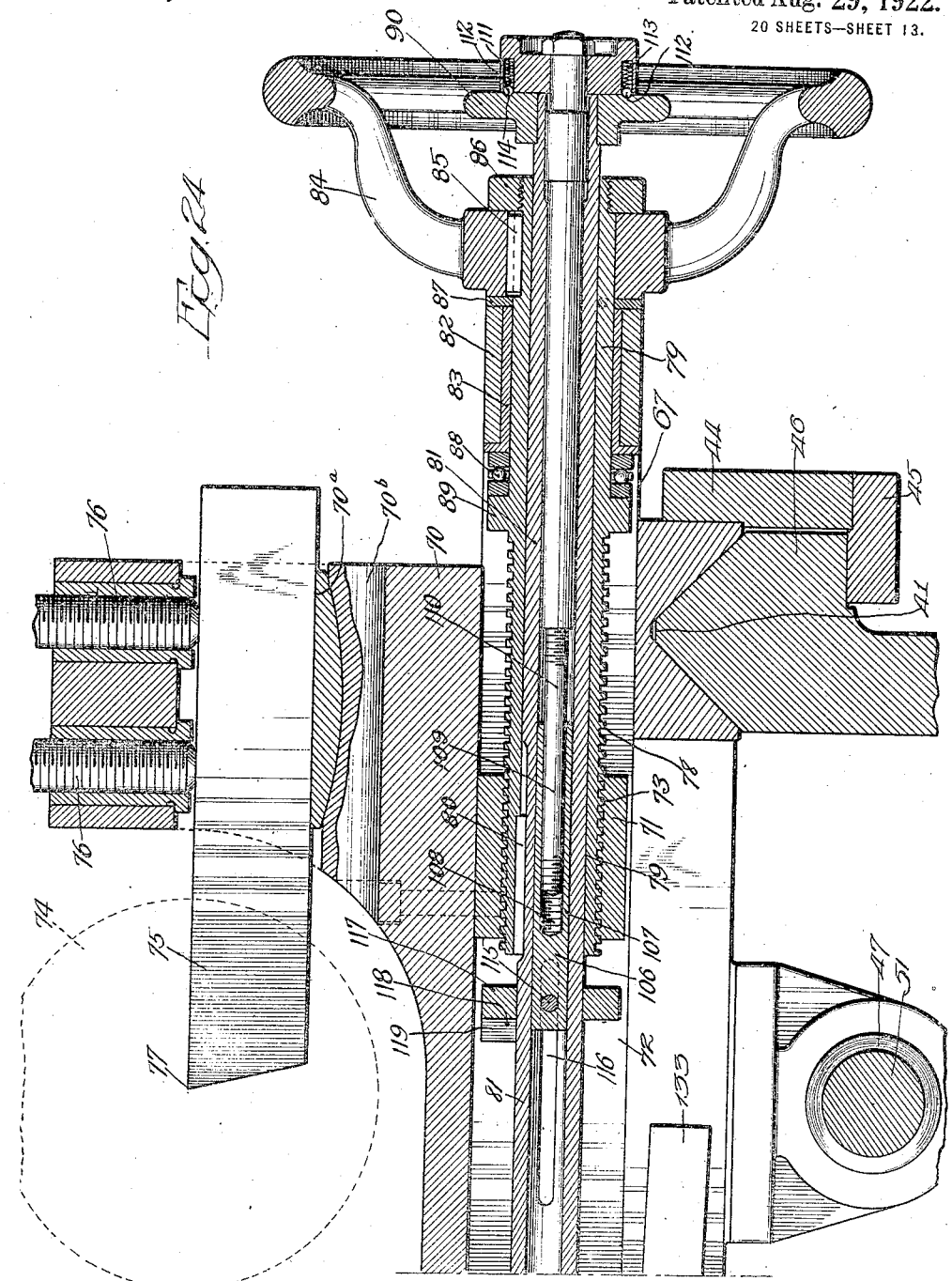

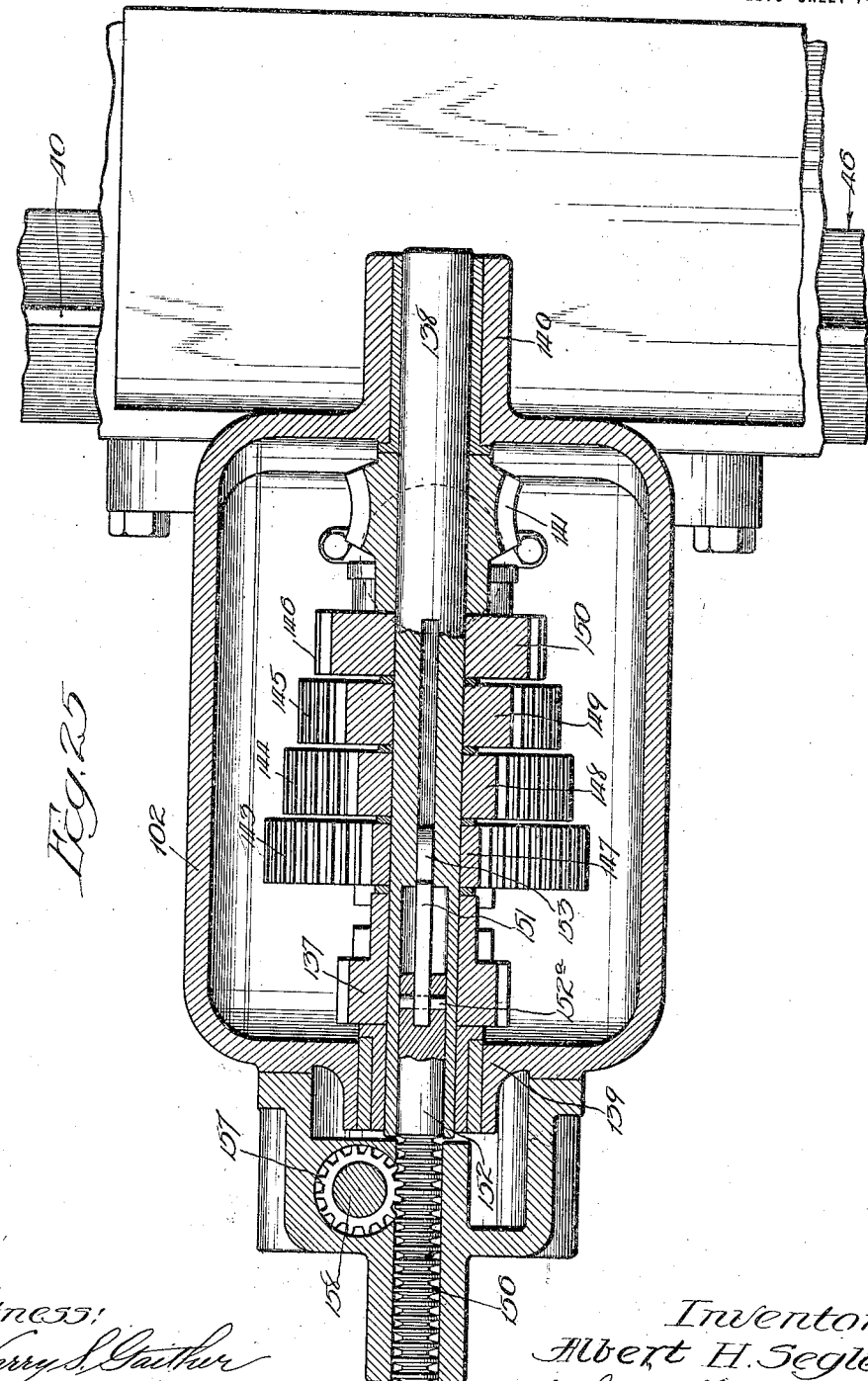

A. H. SEGLER.
SHAFT CUTTING AND CENTERING MACHINE.
APPLICATION FILED JULY 18, 1919.
1,427,233.
Patented Aug. 29, 1922.
20 SHEETS—SHEET 15.
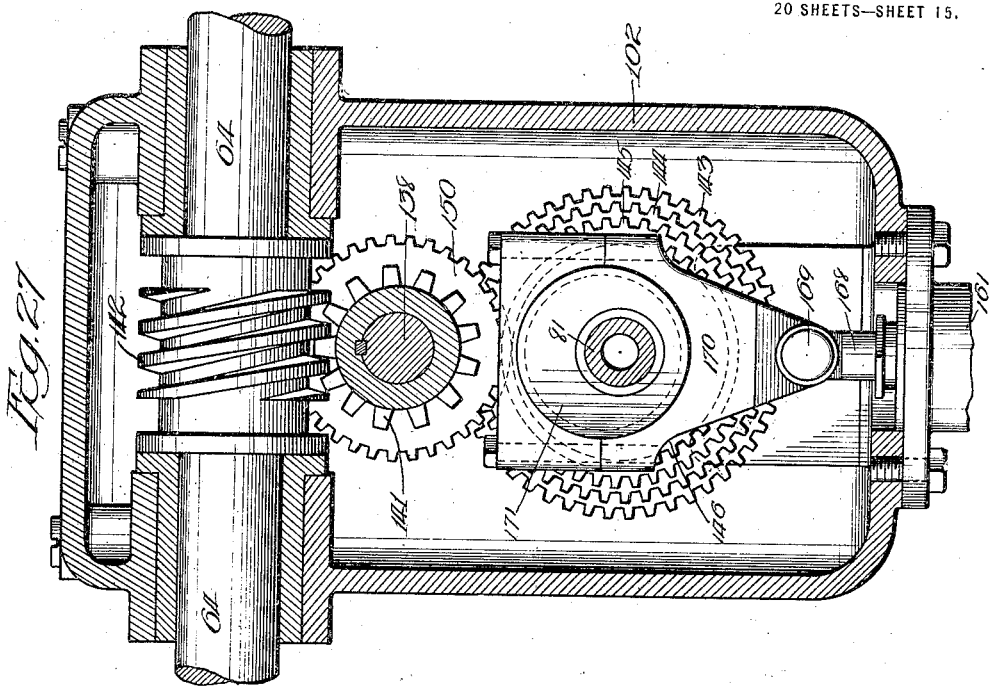
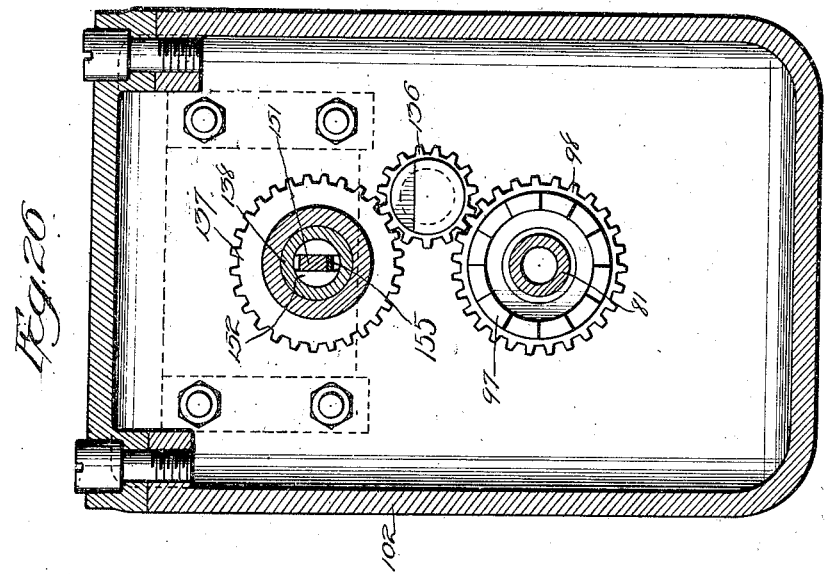
Witness:
Harry S. Guthier
Inventor:
Albert H. Segler
by Grenforth, Lee, Chritton & Wiles
Attys

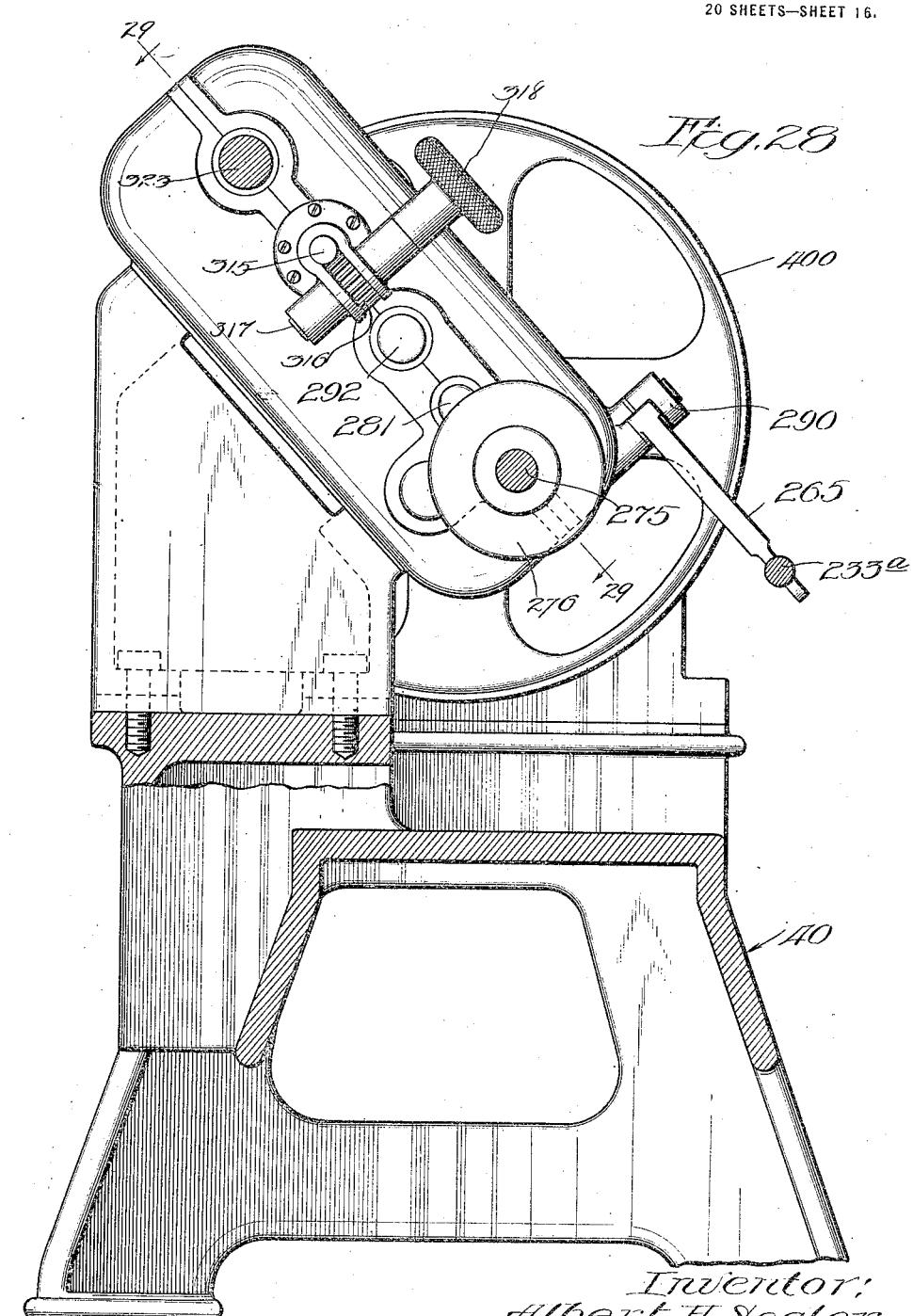

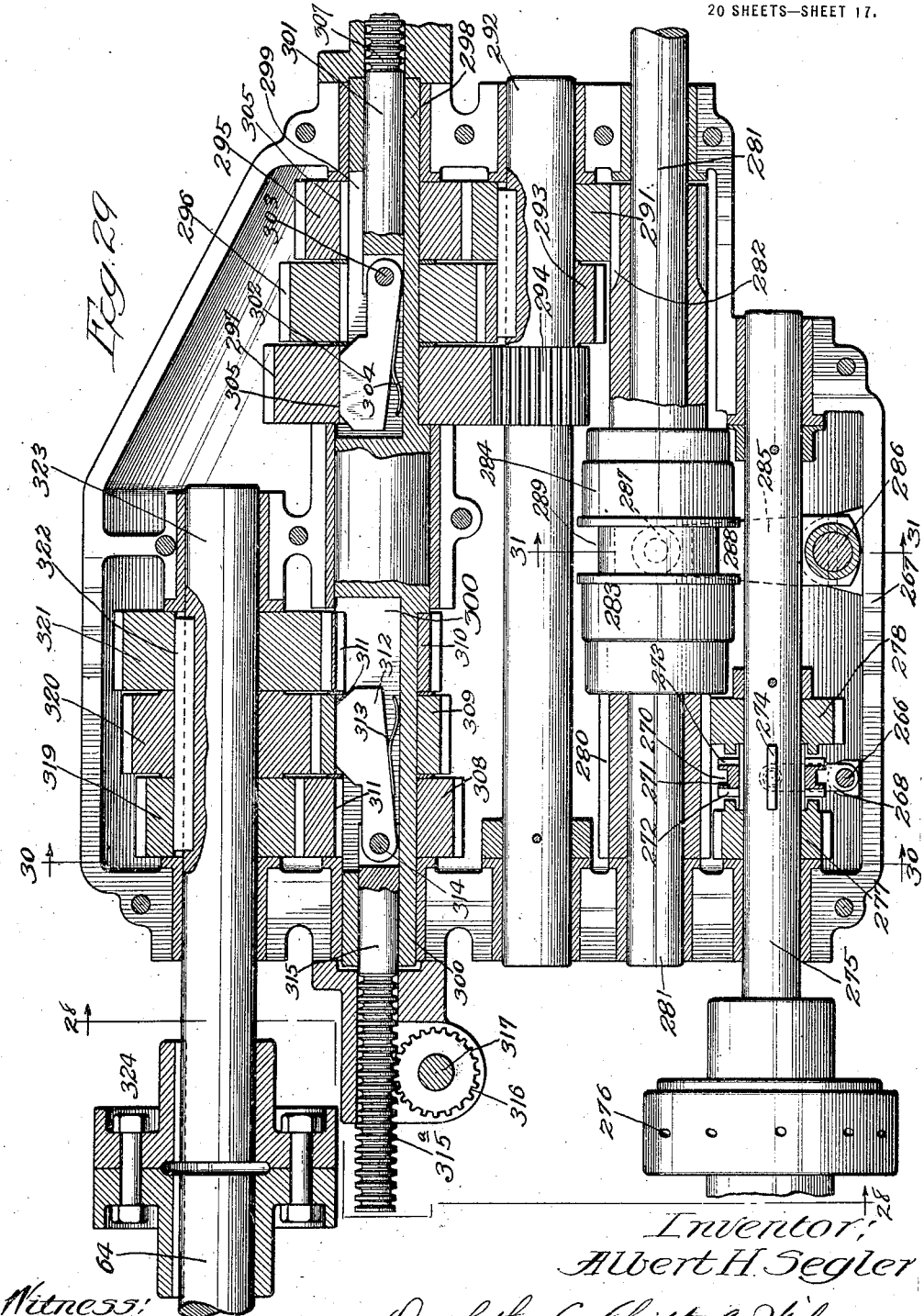

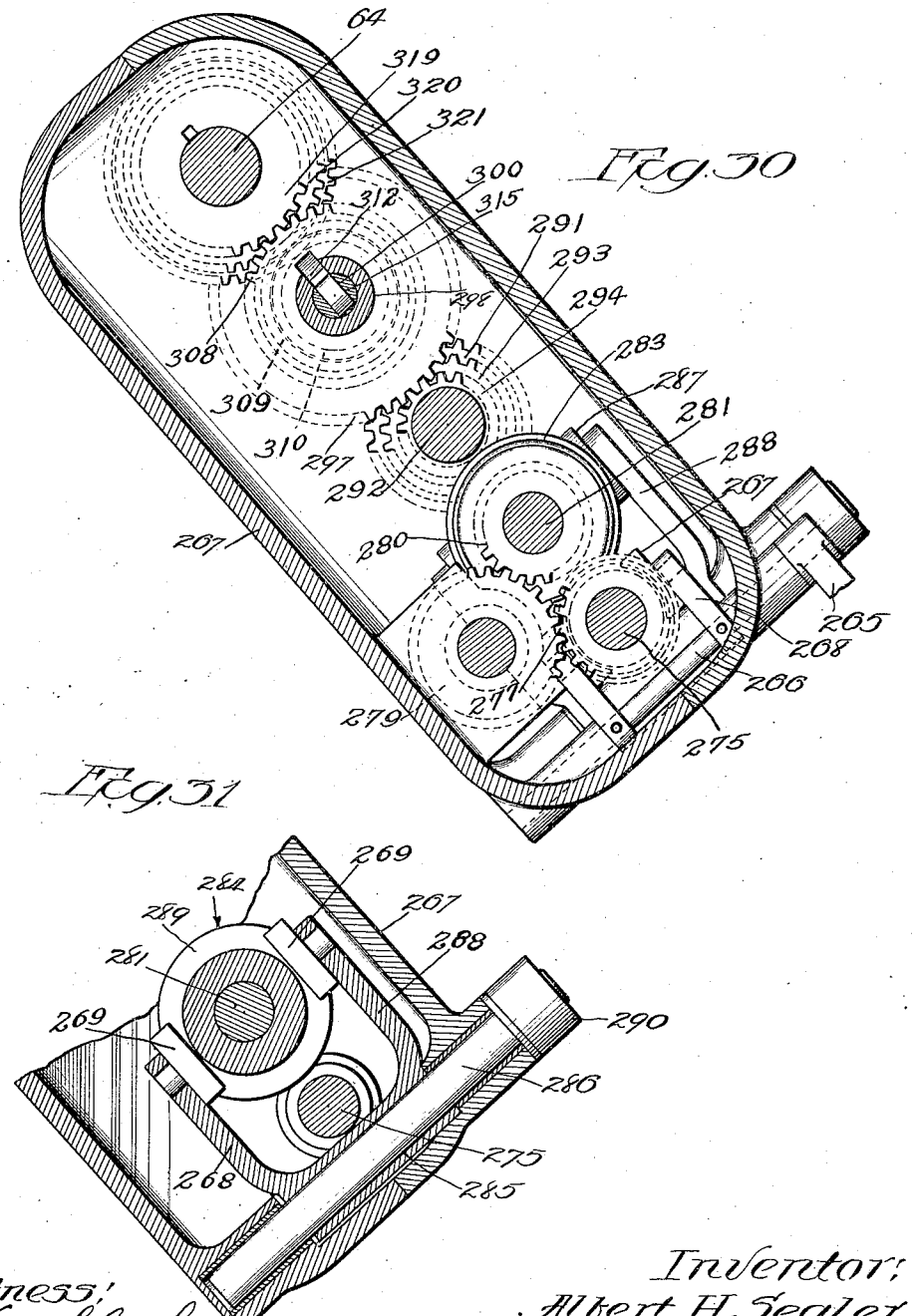

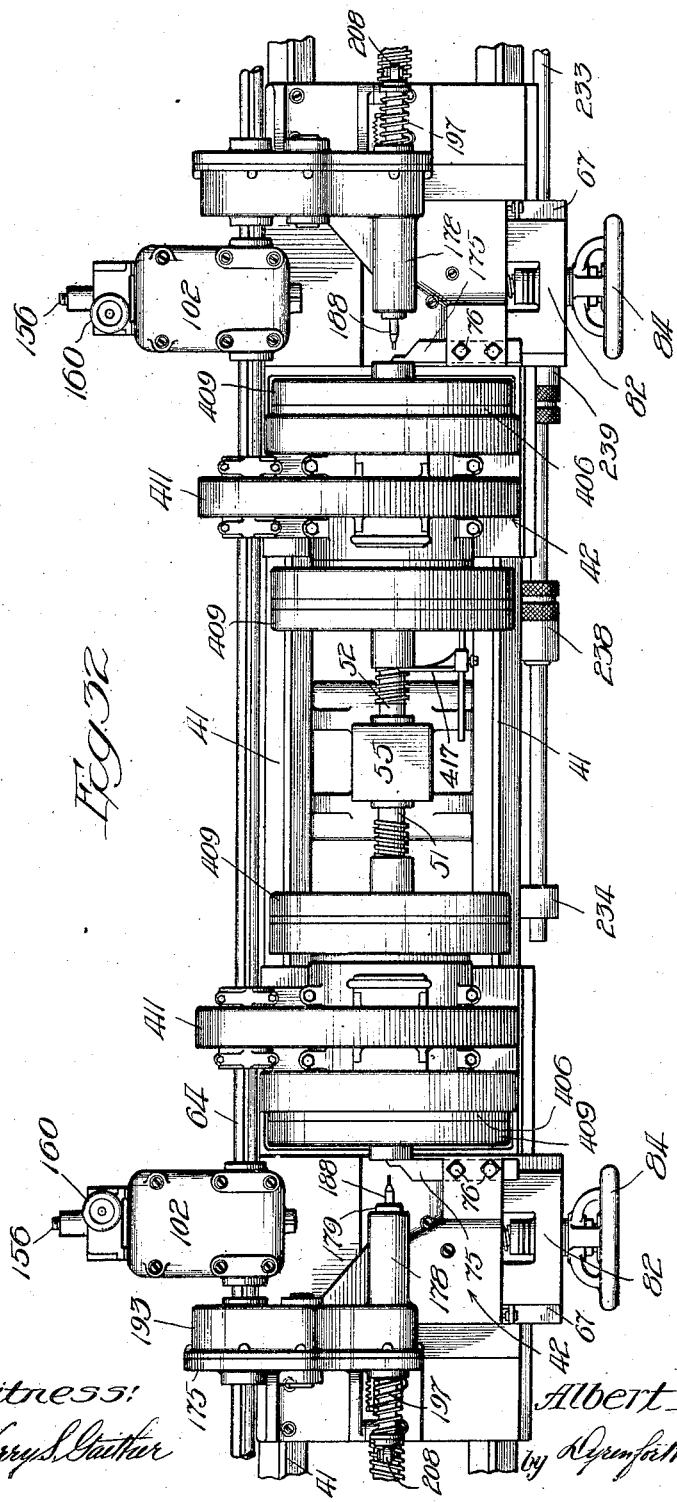

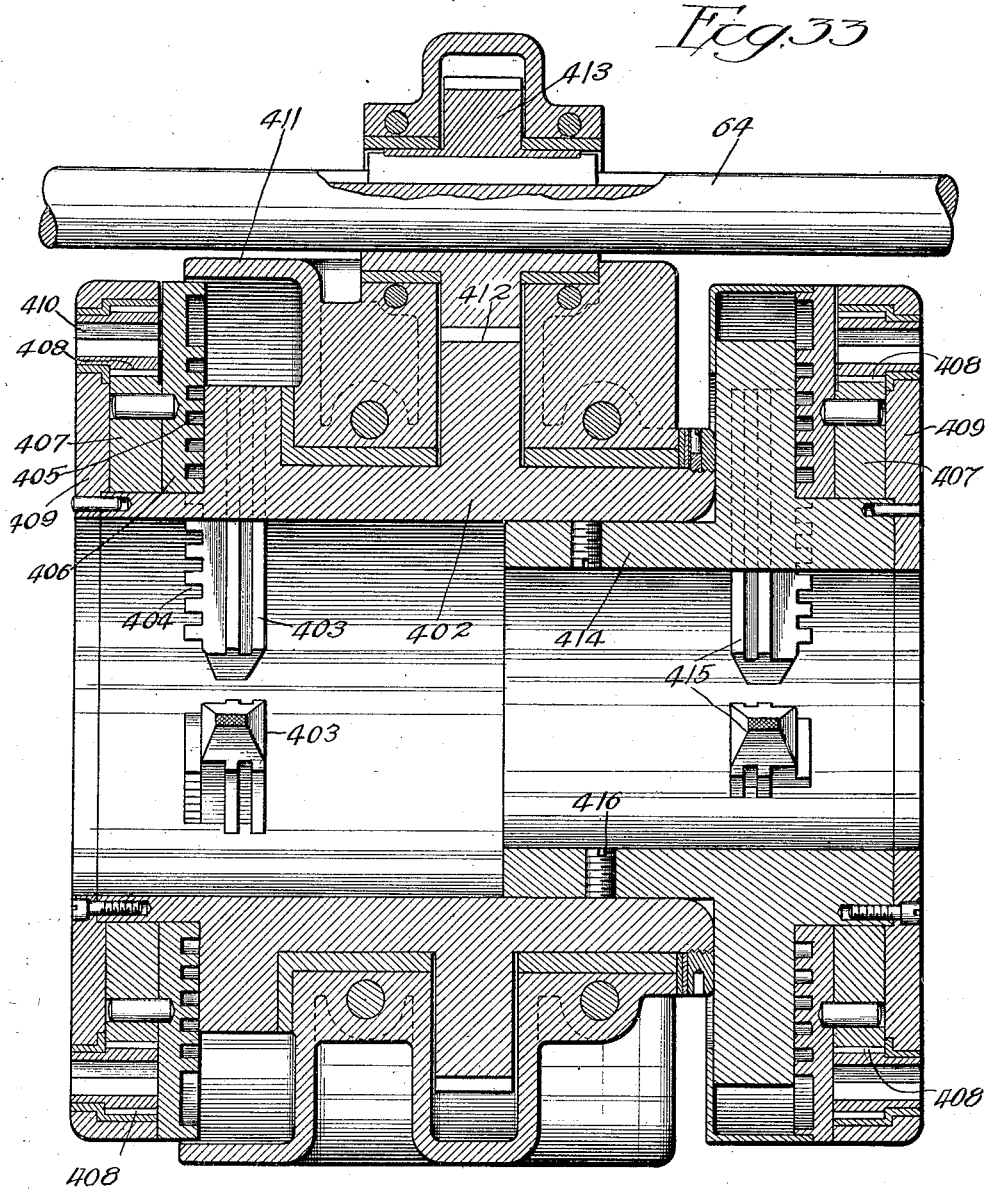

UNITED STATES PATENT OFFICE.

ALBERT H. SEGLER, OF CHICAGO, ILLINOIS, ASSIGNOR TO GOODMAN MANUFACTURING COMPANY, OF CHICAGO, ILLINOIS, A CORPORATION OF ILLINOIS.

SHAFT CUTTING AND CENTERING MACHINE.

1,427,233.  Specification of Letters Patent.  Patented Aug. 29, 1922.

Application filed July 18, 1919. Serial No. 311,757.

*To all whom it may concern:*

Be it known that I, ALBERT H. SEGLER, a citizen of the United States, residing at Chicago, in the county of Cook and State of Illinois, have invented a new and useful Improvement in Shaft Cutting and Centering Machines, of which the following is a specification.

My invention relates, more particularly, to machines for cutting off the ends of shafts to a given length and forming in the finished ends thereof openings for receiving centering points of lathes in which the shafts are turned to finished condition.

My object, generally stated, is to so improve upon machines of this general character that they will be better adapted for performing the work for which they are provided; and specifically stated some of my objects are to provide a machine which will operate automatically to first cut off the ends of the shaft to a given length and following this operation form the center-holes in the ends of the shafts, to insure uniformity in the depth of penetration of the center-hole-forming tools, into the ends of the shafts, and the uniformity of length of the shafts cut on the machine with one setting thereof, whereby all the shafts so produced will be identical, which is of special advantage where the shafts are to be turned in engine lathes with multiple stops; and other objects as will be manifest from the following description.

Referring to the accompanying drawings:—

Figure 8:
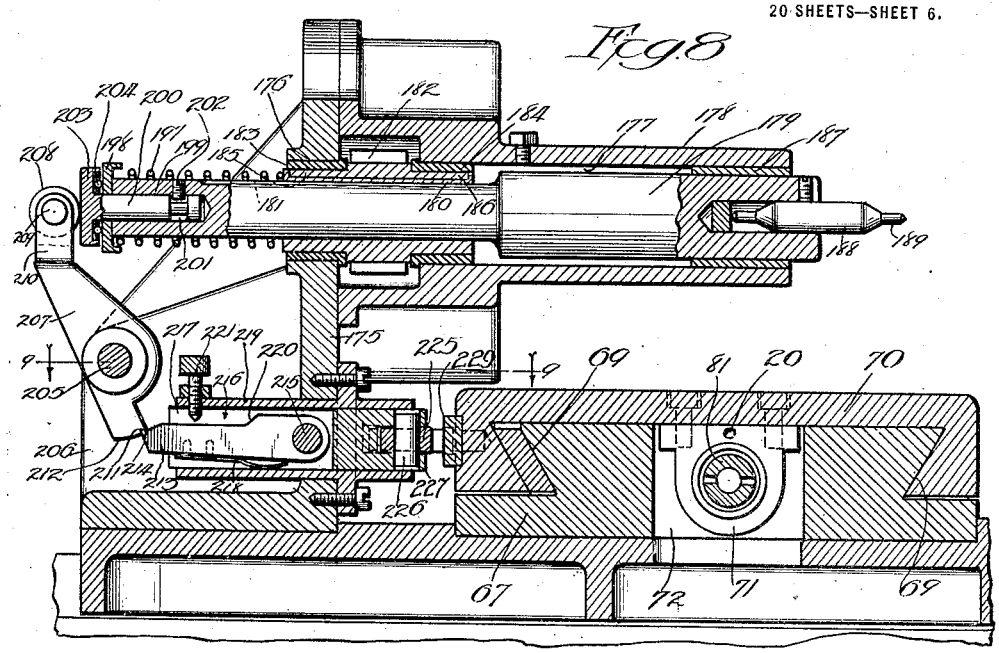
Figure 9:
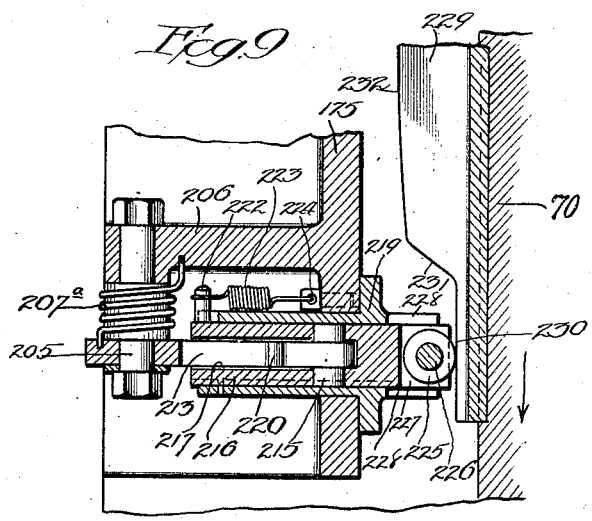

Figure 1 is a plan view of a machine constructed in accordance with my invention, certain parts being broken away, and the machine being shown in a position it assumes when the tools for cutting off the ends of the shaft have finished the cutting operation and have started to move outwardly, the shaft being omitted in this figure. Figure 2 is a view in side elevation of the machine. Figure 3 is a view, with certain parts broken away, of the portion of the machine where the work is operated on, the work being shown in position for being operated on with a portion thereof broken away, and the parts of the machine being shown in the position they assume at the conclusion of the operations of cutting off the ends of the shaft and forming the center-holes therein. Figure 4 is a view in longitudinal sectional elevation of the mechanism shown in Fig. 3, but showing the parts in the position shown in Figs. 1 and 2. Figure 5 is a section taken at the line 5—5 on Fig. 4 and viewed in the direction of the arrows. Figure 6 is an enlarged plan view of the left-hand end of the machine in Fig. 1. Figure 7 is a view in longitudinal sectional elevation of the mechanism shown in Fig. 6, the section being taken at the line 7—7 on this figure and viewed in the direction of the arrows, certain parts of the mechanism being shown in elevation. Figure 8 is a view similar to Fig. 7, but enlarged, and showing certain other parts in section, of the means for feeding one of the center-hole-forming tools into drilling position. Figure 9 is a broken section taken at the irregular line 9—9 on Fig. 8 and viewed in the direction of the arrows. Figure 10 is a view in elevation of the mechanism shown in Fig. 8, with certain parts shown in section, this view showing this part of the mechanism by dotted lines in the position it assumes following the center-hole-forming operation and the withdrawal of the center-hole-forming tool away from the work to idle condition, and by full lines, the position of the parts at the limit of the inward movement of the tool in the center-hole-forming operation. Figure 11 is a section taken at the line 11—11 on Figs. 6 and 7, and viewed in the direction of the arrows. Figure 12 is a section taken at the line 12—12 on Fig. 6 and viewed in the direction of the arrows. Figure 13 is a section taken at the line 13—13 on Fig. 14 and viewed in the direction of the arrows, this view showing a portion of the mechanism by means of which one of the center-hole-forming tools is rotated. Figure 14 is an end view, with certain parts in section, of the mechanism shown in Fig. 8, this view being taken from the left-hand side of this figure. Figure 15 is an enlarged section taken at the line 15—15 on Fig. 3 and viewed in the direction of the arrows. Figure 16 is an enlarged view in side elevation, with certain parts shown in section and some broken away, of one of the two similar stop devices employed. Figure 17 is a view in side elevation of a portion of the mechanism controlling the automatic positioning of the work-holder and cutting devices in the positioning of the parts of the machine for beginning the cutting operations, this view showing a releasable slide-connection employed between the sections of the actuating rod. Figure 18 is a section taken at the line 18—18 on Fig. 17 and viewed in the direction of the arrows. Figure 19 is a view like Fig. 17, showing a portion of the mechanism in section, the releasable connection above referred to being shown in Fig. 17 in position for interlocking the sections of the rod together and in Fig. 19 in break-joint position. Figure 20 is a section taken at the line 20—20 on Fig. 19 and viewed in the direction of the arrows. Figure 21 is a section taken at the line 21—21 on Fig. 6, and viewed in the direction of the arrows, this view showing one of the similar mechanisms for feeding one of the two similar tools for cutting off the ends of the shaft, the parts being shown in the positions they assume immediately upon the beginning of the outward movement of the cutting tool following the operation of cutting off the ends of the shaft. Figure 22 is a view similar to Fig. 21, showing the positions assumed by the parts at the conclusion of the operation of withdrawing the tool to idle position after the shaft-cutting and center-hole-forming operations have been completed. Figure 23 is an enlarged view like Fig. 22, but showing more of the parts sectioned, of the structure at the left-hand end of this figure; and Figure 24, a similar view showing the structure at the right-hand end of Fig. 22; Figs. 23 and 24 being continuations of each other and showing the parts in the positions they assume during the feeding of the cutter inwardly in the operation of cutting off the ends of the shaft, the tool having travelled inwardly almost to the end of its stroke. Figure 25 is a section taken at the line 25—25 on Fig. 23, and viewed in the direction of the arrows. Figure 26 is a section taken at the line 26—26, on Fig. 23, and viewed in the direction of the arrows. Figure 27 is a section taken at the line 27—27 on Fig. 23 and viewed in the direction of the arrows. Figure 28 is an enlarged section taken at the line 28 on Fig. 2 and viewed in the direction of the arrows. Figure 29 is an enlarged section taken at the line 29—29 on Fig. 28, and viewed in the direction of the arrows, this view showing certain transmission mechanism employed. Figure 30 is a section taken at the line 30—30 on Fig. 29, and viewed in the direction of the arrows. Figure 31 is a broken section taken at the line 31—31 on Fig. 29, and viewed in the direction of the arrows. Figure 32 is a plan view of a portion of the machine of the preceding figures modified to adapt it for the cutting of relatively short shafts and the forming therein of the center-holes; and Figure 33, a plan sectional view, taken through one of the two similar double chucks of the machine of Fig. 32.

The frame of the machine is represented at 40, it being formed along its upper side with guides 41 extending lengthwise of the machine and arranged in parallel spaced relation, these guides being preferably of the upwardly converging form in cross-section, as illustrated (Figs. 5 and 22). Mounted on the guides 41 to be movable along the latter, lengthwise of the machine, is a pair of heads 42 and 43, these heads being of the same construction but provided as rights and lefts as shown in Fig. 3. These heads are provided with means for preventing the upward displacement of these heads on the guides in the operation of the machine, these means being formed of depending plates 44 (Figs. 3 and 5) secured to the body of the heads and inwardly extending plates 45 secured to the plates 44 and underlapping the bottom portions 46 of the adjacent guides 41. The heads 42 and 43 are provided, intermediate the guides 41, with depending lugs 47 and 48, respectively, these lugs containing openings therethrough extending in the direction of the length of the guides 41 and internally screw-threaded, as represented at 49 and 50, respectively, the thread 49, viewing the construction from the right-hand side of Fig. 4 being a left-hand thread and the thread 50 a right-hand thread. Screwing, respectively, into these threads are threads 51$^a$ and 52$^a$ provided on the peripheries of alining shafts 51 and 52, respectively, rigidly coupled together by a sleeve 54 surrounding these shafts and journaled in a bearing 55 in the frame 40 of the machine, these shafts extending lengthwise of the machine and midway between the guides 41, the shaft 51 being journaled at its outer end in a bearing 56 on the frame 40 and the shaft 52 being journaled at its outer end in a bearing 57 on the frame 40, the threads on these two shafts corresponding with the threads in the lugs 47 and 48, respectively, whereby when the shafts 51 and 52 are rotated in one direction, the heads 42 and 43 will be moved on the guides 41 toward each other and when rotated in the opposite direction these heads will move away from each other for a purpose hereinafter explained, the shafts 51 and 52 which, in reality form a single shaft, being driven as hereinafter described.

The heads 42 and 43 carry means for supporting and rotating the shaft, the ends of which are to be cut off and bored to present center-holes and also means for cutting off the ends of a shaft to a predetermined length and means for forming the center-holes in the opposite ends thereof, it being understood that the mechanisms on these two heads operate, respectively, on the opposite ends of the shaft to be operated on. As the mechanisms just referred to are the same on each head, except that the position of the parts are reversed to adapt the devices to operate on the opposite ends of the shaft, a detailed description of one head including the mechanism thereof, will suffice.

The head is provided with a housing 58 of general cylindrical form and preferably of the irregular contour as represented (Fig. 4), in the bearing portions 59 and 60 of which a rotary chuck device 61 is journaled, the portions 58ᵃ being oil-chambers. The chuck device, which may be of any desired construction, contains an opening extending entirely therethrough for receiving the shaft to be operated on, and is provided with means as are common in chuck constructions, for rigidly securing the shaft in the chuck concentrically with the axis about which the latter rotates. In the construction shown, the chuck is provided with a gear 62 encircling it and rigidly secured thereto which meshes with a gear 63 splined on a shaft 64 journaled in bearings 65 and 66 rising from the frame 40, the shaft 64 being driven as, and for the purpose, hereinafter explained.

The head is provided on its upper face, beyond the outer end of the chuck 61 and below the plane of the axis of the latter, with a plate 67 rigidly secured thereto as by bolts 68, this plate being provided on its upper face, at opposite edges thereof, with undercut grooves 69 extending transversely of the machine. Supported on the plate 67 and engaging the grooves 69, to be moved transversely of the machine, is a carriage 70 provided with a depending lug 71 extending into a recess 72 in the plate 67, this lug being internally screw-threaded transversely of the machine; as represented at 73 and forming a nut for a purpose hereinafter explained, the carriage 70 being adapted to support and feed against the work represented at 74, the tool, such as that shown at 75 for cutting off the end of the shaft 74, the tool 75 being supported on the carriage 70 in any desired manner, as, for example, by means of set-screws 76 (Fig. 24) which clamp the tool securely in place in a recess 70ᵃ in an extension 70ᵇ of the carriage, the cutting edge 77 of the tool extending into substantially the same horizontal plane as the axis of the work 74. The nut 71 surrounds, and engages at its thread 73 with, the threaded portion 78 of a sleeve 79 keyed, as indicated at 80, to a hollow shaft 81 which it surrounds, the shaft 81 being longitudinally shiftable in the sleeve 79. The sleeve 79 is journaled in a bearing 82 on the plate 67, with a bushing 83 interposed between these parts, and carries at its outer end, rigidly secured thereto, as by a key 85, a hand-wheel 84, a nut 86 being screwed upon the outer threaded end of the sleeve 79 for holding the wheel 84 in place. By preference a washer 87 is interposed between the bearing 82 and hand-wheel 84, and a ball-bearing 88 between the bushing 83 and an annularly flanged portion 89 of the sleeve 79. The outer, right-hand end (Fig. 24), of the hollow shaft 81 is provided with a knob 90 rigidly secured thereto, the opposite end of this shaft, which is plugged as indicated at 91, carrying a clutch-member 92 rigidly secured to the shaft 81 by a pin 93, this clutch-member being provided at opposite sides with annular series of teeth 94 and 95 for co-operation with clutch-members 96 and 97 arranged about the shaft 81 at opposite sides of the member 92, the clutch-member 97 being rigid with a gear 98 journaled on the shaft 81 with a bushing 99 interposed between the shaft 81 and the gear 98 and a sleeve-portion 100 extending laterally from the gear 98 and a bushing 99ᵃ interposed between the sleeve 100 and a bearing opening 101 in a casing 102 carried by the plate 67, the outer end of the sleeve 100 carrying a collar 103 located at the outside of the casing 102 to prevent longitudinal displacement of the gear 98. The clutch-member 96 is formed as a part of a sleeve 104 surrounding the hollow shaft 81 and journaled thereon, with a bushing 105 interposed between these parts. The arrangement of the parts just described is such that the clutch-member 92 may be moved into engagement with either the clutch 96 or 97 as desired, and may be moved into a position in which it is not in mesh with either of these clutch-members, the position of the clutch-member 93 being controlled by the longitudinal position of the hollow shaft 81. The right-hand end of the shaft 81 in Fig. 24 contains a rod 106 which has limited longitudinal movement therein and contains a longitudinally extending socket 107 in one end, this socket being internally screw-threaded as indicated at 108 and having threaded engagement with the threaded, reduced, end 109 of a rod 110 journaled in the hollow shaft 81 and connected at its outer end with a knob 111 containing spring-pressed ball-devices 112 in recesses 113 in a face thereof, the balls of which bear against the outer face of the knob 90 and are adapted to enter the opposing ones of recesses 114 provided in an annular series about the hollow shaft 81, to hold the rod 110 in rotatably adjusted position in the shaft 81. The rod 106 is rigidly connected by a pin 115 extending through opposed elongated slots 116 in the hollow shaft 81, with a disk 117 surrounding, and slidable along, the shaft 81, this disk provided with a lug 118 having an inclined cam face 119 which extends into the path of movement of a pin 120 secured in a depending lug 121 on the carriage 70 and through which the hollow shaft 81 extends (Fig. 22), the pin 120 extending in a direction lengthwise of the shaft 81 and projecting beyond the end of the lug 121. The lug 121 is spaced from the shaft 81 at the opening 122 in the lug, and in this space is located a longitudinally sliding sleeve 123 loosely surrounding the shaft 81 and containing an elongated slot 124 into which a pin 125 on the lug 121 projects, the outer end of the sleeve 123 being annularly flanged, as indicated at 126, between which flange and the adjacent end of the lug 121, a coiled spring 127, surrounding the sleeve 123, is located, this spring tending to move the sleeve 123 to the left in Fig. 22 to a position in which the right-hand end wall of the slot 124 bears against the pin 125. Co-operating with the flanged portion 126 of the sleeve 123 is a lever-forming a latch device 128 pivotally supported on a bracket 67$^a$ on the plate 67, as indicated at 129. The left-hand end of this lever in Fig. 22, contains a notch 130 for engagement by the flange 126, and is formed with a cam-surface 131 located between the notch 30 and the pivot 129 and which, when the latch 128 is in position for interlocking with the flange 126 (Fig. 23), extends into the path of movement of the lower end of the pin 125 in the inward movement of the carriage 70, and by this engagement causes the latch 128 to rock in anti-clockwise direction in Fig. 22 on its pivot 129 to disengage the latch from the flange 126, for a purpose hereinafter explained. The latch 128 carries a pin 132 which normally engages a part of the bracket 67$^a$ to hold the latch 128 normally in the position shown in Fig. 22 in opposition to its tendency to rotate in clockwise direction in this figure, under the action of its opposed, weighted, end-portion 133. The shaft 81 at a point beyond the shoulder portion 130 of the latch 128 carries a collar 134 rigidly secured thereto, as by a pin 135, for co-operation with the sleeve 123, as hereinafter set forth.

It may be stated that the mechanism just described and provided on each head 42 and 43 is provided for the purpose, generally stated, of controlling the inward movement of the tools 75 for cutting off the ends of the work and withdrawing them to idle position beyond the work, this being effected by alternately rotating as to each mechanism, the sleeve 78 in opposite directions through the medium first of the clutch member 96 and then through the clutch-member 97. The gear 98, carrying the clutch 97 and the sleeve 104 carrying the clutch 96 are continuously operated from the shaft 64, the gear 98 being operated by a gear 136 journaled in the housing 102 and meshing with a gear 137 rigid on a hollow shaft 138 journaled in the bearings 139 and 140 in the casing 102, the shaft 138 carrying a worm-wheel 141 meshing with a worm 142 carried by, and rotatable with, the shaft 64. The sleeve 104 has keyed thereto a series of gears 143, 144, 145, and 146, of progressively-decreasing size, these gears meshing, respectively, with gears 147, 148, 149, and 150 surrounding, and journaled on, the tubular shaft 138. A shiftable key 151 in the form of a lever extending in the interior of the shaft 138 and pivoted, as indicated at 152$^a$, to a bar 152 longitudinally adjustable in the shaft 138, is provided for entering, at its enlarged portion 153, the longitudinal key-way 154 of any one of the gears 147, 148, 149, and 150, to operatively connect any one of these gears to the shaft 138, the rest of these gears operating as idlers. A spring 155 serves normally to swing the key 151 to a position in which it enters the keyway 154 opposing it. The bar 152 is longitudinally slidable in the hollow portion of the shaft 138 to shift the lever device 151 for the purpose stated, and by preference is provided with a rack 156 meshing with a pinion 157 carried by a rotatable shaft 158 journaled in a bearing 159 on the casing 102, and provided with a hand-wheel 160 for rotating it, it being understood from the foregoing that by shifting the bar 152 the sleeve 104 may be driven at any one of a number of different speeds relative to the rotation of the gear 98 for varying the rate at which the tool 75 feeds into the work. It will be noted that the gearing between the gear 97 and the drive therefor, namely, the shaft 64, is such as to cause this gear to rotate faster than the sleeve 104, which serves to cause the carriage 70 in the withdrawal of the tool 75 after finishing the cut, to move faster than it does in its inward movement for effecting the cutting of the work by the tool 75.

In the particular arrangement shown, means are provided for circulating oil through the transmission mechanism housed in the casing 102, these means comprising a pump formed of a cylinder 161 (Fig. 21), communicating at its lower end with the interior of the casing 102 through a passage 162 formed with a seat 163 controlled by a ball-valve 164 and also connecting with a passage 165 opening into a pipe 166 and containing an outwardly-opening ball-check 167, this pipe opening into the interior of the casing 102. The cylinder 161 contains a piston 168 pivotally connected, as indicated at 169, with a strap 170 surrounding an eccentric 171 on the sleeve 104, whereby in the rotation of the latter the piston 168 operates to perform the pumping function. In order to provide for the circulation of oil under the pumping action an opening 172 is provided which communicates with the interior of the hollow shaft 81 and the interior of the casing 102, and, in addition, openings 173 and 174 which open into the interior of the bushings 99 and 105. The oil is maintained in the casing 102 at a level slightly above the axis of the shaft 81, and in the operation of the pump, oil is forced upwardly against the top of the casing 102, which deflects it over the gears in the top of the casing.

Rising from the head is a supporting member 175 containing an aperture 176 registering with a longitudinally extending opening 177 in a hollow member 178 carried by the member 175 and extending toward the adjacent chuck hereinbefore referred to. The parts just described form a journal support for a spindle 179 extending therethrough, and having keyed thereon, by the key 180, extending into a longitudinal keyway 181 in the spindle 179, a gear 182 which latter is held against longitudinal movement by bushings 183 and 184 surrounding hub-extensions 185 and 186 thereon, but permitting of rotation of the gear 182 with the spindle 179. The spindle 179 is journaled in a bushing 187 located in the outer end of the member 178, the spindle, while being thus rotatably mounted, being free to move longitudinally in the member in which it is journaled. In the operation of the machine the spindle 179, which carries a centering drill 188 of a shape, as shown, suitable for boring a countersunk center-hole in the adjacent end of the work 75, the tool having cutting edges 189 as is common in tools of this character, is rotated from the shaft 64, through the medium of the gear train shown in Figs. 13 and 14 and comprising a gear 190 splined on shaft 64 and meshing with a pinion 191 on a shaft 192 journaled in the walls of a casing 193 of which the member 175 is a part and enclosing the gear train referred to, the shaft 192 carrying a gear 194 which meshes with a gear 195 on a shaft 196 and journaled in the walls of the casing 193, the gear 195 meshing with the gear 182. The spindle 179 is held normally in the position shown in Fig. 8, by a coiled spring 197 surrounding the outer end of the spindle 179 and bearing at its opposite ends, respectively, against an annular shoulder 198 on the spindle and formed as a part of a collar on the spindle, and the adjacent end of the hub 185 of gear 182. The outer end of the spindle 179 is recessed, as indicated at 199, and contains a member 200 rotatable therein and containing an annular groove 201 into which a screw 202 carried by the spindle 179 extends, permitting the member 200 to rotate but preventing accidental longitudinal displacement thereof. The outer end of the member 200 carries a head 203 with ball-bearings 204 interposed between this head and the portion 198 of the spindle 179, whereby the spindle rotates freely relative to the member 200.

The spindle 179, shown in Fig. 8, together with the parts carried thereby, is adapted to be projected to the right in this figure, and in this movement sliding through the gear 182, to cause the tool 188 to bore the center-hole in the adjacent end of the shaft 75, after the end of the shaft has been operated on by the cutter 75, the mechanism for thus shifting the spindle 179 being as follows:

Journaled between its ends on a shaft 205 extending transversely of the machine and laterally from a web 206 connected with the member 175, is a rock-lever 207, the upper end of which carries a roller 208 journaled on a shaft 209 secured in the bifurcated upper end 210 of this lever, the roller 208 opposing, and co-operating with, the member 203. A torsion spring 207a surrounding the shaft 209 and engaging at its opposite ends with the upright 175 and the lever 207 operates to yieldingly force the lever 207 at its upper end to the right in Fig. 8. The lower end of this lever contains a recess 211 and its bottom surface is curved as represented at 212. The recess portion 211 of this lever co-operates with a finger 213, a tooth portion 214 of which latter is adapted to engage in the recess 211 as hereinafter described. The finger 213 is journaled at the end thereof opposite the tooth 214 on a pin 215 carried by, and extending transversely of, a slide-member 216 which is slotted lengthwise, as indicated at 217, and in which slotted portion the finger 213 is located, this finger being adapted to be rocked up and down on the pin 215. A spring 218 carried by the finger 213 at its underside bears against the bottom wall of a guide-casing 219 in which the member 216 is located and is longitudinally movable, and operates to yieldingly force the outer, toothed, end of the finger 213 upwardly in Fig. 8. The upper surface of the finger 213 has a cam portion 220 adapted to engage, in the movement of the slide 216 as hereinafter explained, with the lower end of a screw 221 adjustably mounted in the top of the guide-casing 219 and extending at its lower end into the slot 217. The slide-member 216, which carries a laterally extending pin 222 connected with one end of a coiled spring 223, the opposite end of which connects at 224 with the member 175 for moving the guide-member 216 toward the carriage 70, carries a roller 225 journaled on a pin 226 secured in the bifurcated end 227 of the slide-member 216, the adjacent end of the guide-casing 219 and being horizontally slotted at opposite sides thereof as represented at 228. The roller 225 extends into the path of movement of a cam 299 on the carriage 70, this cam being formed with a flat surface 230, a relatively abrupt cam-surface 231 and a relatively slightly tapering surface 232, the cam 229 registering with the slotted portion 228 of the member 219.

A description of the mechanism, according to the preferred illustrated embodiment of my invention, for rotating the shafts 51 and 52 preparatory to the clamping of the work 74 in place in the chucks 61 and following the operations of cutting off the ends of the shafts and forming the center-holes therein; and also rotating the chucks 61, and actuating the cutters 75 and rotating and longitudinally moving the drills 188, is as follows:

Extending lengthwise of the machine at the outer side of the frame 40, is a rod formed of alining sections 233 and 233$^a$, which is slidable lengthwise in bearings 234 and 236 on the frame 40 and a bearing 235 on the head 43, the section 233$^a$ of this rod having an operating handle 237 for shifting it lengthwise. The section 233 is provided with a pair of stops 238 and 239, Figs. 2, 3, and 16 of the same construction, but reversely disposed on the rod section 233 as shown in Fig. 2, each of said stops being formed of a sleeve 240 surrounding the rod section 233, with one end longitudinally split at opposite sides thereof, as indicated at one side at 241, to render its end 242 contractible about the rod, the outer surface of this end of the sleeve 240 being tapered, as indicated at 243, at which portion it is engaged by the reversely-tapered wall 244 of an opening 245 in a sleeve-member 246 surrounding the contractible end of the sleeve 240 and screwing at its internally-threaded portion 247 upon an externally-threaded portion 248 of the sleeve 240, whereby the stops 238 and 239 may be readily gripped to the rod-section 233 at any desired position along the latter. These stops co-operate with a lug projecting from the head 43, the bearing 235 on the head 43 constituting this lug, which, as shown, surrounds the rod-section 233, the said stops extending into the path of its movement in opposite directions as hereinafter described. The rod section 233 also carries a coupling-device 250 (Figs. 2, 17, 19 and 20), for releasably coupling together the rod-sections 233 and 233$^a$, this coupling comprising a sleeve 251 encircling the rod-section 233 and pinned thereto, as indicated at 252, and likewise encircling the adjacent end of the rod-section 233$^a$, a pin 253 carried by the rod section 233$^a$ extending at an end thereof into an elongated slot 254 in the sleeve-section 251. The sleeve-section 251 is also longitudinally slotted at opposite sides, as indicated at 255, in which slots fingers 256 are located, these fingers, which are normally pressed toward the center of the rod-sections 233 and 233$^a$ by springs 257 secured by the screws 258 to the sleeve-member 251, having shouldered portions 259 formed with tapered surfaces 260 at which they interlock with the annular tapered surface 261 forming a wall of an annular groove 262 in the adjacent end of the rod-section 233$^a$. The normal position of the parts just described is that illustrated in Fig. 17 wherein the shouldered portions 259 of the fingers 256 extend into the groove 262, thus locking the rod-sections 233 and 233$^a$ together for longitudinal movement when shifted through the medium of the lever 237. When, however, the rod section 233$^a$ is locked against lengthwise movement as, and for a purpose, hereinafter described, and the rod-section 233 is shifted, the connection 250 between these rod-sections gives sufficiently, moving to the position shown in Fig. 19, to permit of this relative movement of the rod-sections. The lock for the rod-section 233$^a$, in the construction shown, comprises a lever 262$^b$ pivoted at 262$^a$ on the bearing 236 and adapted to bear under the action of a spring 262$^c$ against the rod-section 233$^a$ and enter, and become interlocked with the walls of, an annular groove 263 in the rod section 233$^a$ when the latter is shifted to the left in Fig. 17 by the engagement of the lug 235 with the stop 238.

The rod formed of the sections 233 and 233$^a$ is pivotally connected, as indicated at 264, with one end of a clutch lever 265, the opposite end of the latter being rigidly connected with a shaft 266 journaled in a transmission casing 267 supported on the frame 40 of the machine, the shaft 266 carrying rigid thereon the bifurcated arm 268 in the casing 267, the ends of which carry shoes 269 which extend into the annular groove 270 provided in the periphery of a rotary clutch-disk 271 (Figs. 29 and 31), having clutch teeth 272 and 273 at opposite faces thereof, this disk being splined at 274 on a shaft 275 journaled in the casing 267 and connected through the medium of a friction-drive connection 276 of any suitable construction, with the shaft 52. Rotatable on the shaft 275 at opposite sides of the clutch member 271 are gears 277 and 278, the gear 277 meshing with a gear 279 which in turn meshes with a gear 280 on a shaft 281 journaled in the walls of the casing 267. The gear 280 also meshes with the gear 278. The shaft 281 through the medium of which the machine is driven, as, for example, by an electric motor 400 on the frame 40, the shaft of which is attached to the right-hand end of the shaft 281, in Fig. 29, as by a coupling 401, in addition to carrying the gear 280 carries a gear 282, and interposed between the gears 280 and 282 and surrounding the shaft 281, are clutch means adapted when in one position to clutch the gear 280 to the drive shaft 281 and when moved in the opposite direction to clutch the gear 282 to this shaft, the clutch when in the position shown in Fig. 29 being in neutral position wherein neither of these two gears is connected with the shaft 281. Any suitable clutch means may be provided for this purpose, those shown being what is known in the art as a "Johnson" clutch, involving a clutch device 283 for connecting the gear 280 with the shaft 281 and a clutch device 284 for connecting the gear 282 to this shaft, these clutch devices being operated through the medium of a lever 285 connected with a shaft 286 journaled in the casing 267 and extending at shoes 287 in its bifurcated portion 288, into an annular groove 289 in the clutch mechanism referred to, whereby when the lever 285 is rocked in clockwise direction in Fig. 29, the gear 282 will be clutched to the shaft 281 and the gear 280 unclutched from this shaft, and when rocked in anti-clockwise direction in this figure, the gear 280 will be clutched to shaft 281 and the gear 282 unclutched from this shaft, shaft 286 being provided with an operating lever 290 extending exteriorly of the casing 267. The gear 282 meshes with a gear 291 keyed on a shaft 292 journaled in a casing 267, this shaft also carrying gears 293 and 294 keyed thereto, these three gears meshing respectively with gears 295, 296, and 297 journaled on a shaft 298 journaled in the casing 267. The opposite ends of the shaft 298 are slotted as indicated at 299 and 300, the slot 299 containing a longitudinally movable bar 301 provided at its inner end with a locking key 302 in the form of a lever pivoted thereto as indicated at 303, and yieldingly forced in an outward direction by a leaf-spring 304. The gears 295, 296 and 297 are longitudinally grooved on their inner surfaces, as indicated at 305, to form keyways and are adapted to receive the edge portion of the key 302 which latter, upon shifting the rod 301, as by means of a rotatable member 306 mounted on the casing 267 and equipped with a pinion (not shown) engaging with an annular rack 307 on the outer end of the bar 301, as explained of the construction shown in Fig. 25, may be moved into the keyway 305 of either one of these gears to clutch it to the shaft 298, the other gears above referred to as provided on this shaft thereby operating idly. The shaft 298 at its opposite end carries three gears 308, 309, and 310 journaled thereon and likewise containing keyways 311 for co-operation with a key 312 outwardly spring-pressed by a spring 313 and pivoted at 314 to a longitudinally movable rod 315 sliding in the groove 300 in the shaft 298 and having an annular rack portion 315ª meshing with a gear 316 on a shaft 317 having a hand-wheel 318 extending exteriorly of the casing 267, this shaft being journaled in the latter, whereby upon rotating the shaft 317, the key 312 may be caused to clutch any one of the gears 308, 309, and 310 to the shaft 298, the other gears of this group then operating as idlers. The gears 308, 309 and 310, mesh, respectively, with gears 319, 320 and 321 keyed at 322 on the shaft 323 journaled in the casing 267 and connecting with the shaft 64 through the medium of a coupling 324 of any desirable construction.

A description of the operation of the machine is as follows:

The normal, inoperating, position of the parts of the machine, namely, the position occupied by the parts thereof upon concluding the cutting and center-hole-forming operations, and after the separation of the heads 42 and 43 to permit of the removal of the finished work and the manual shutting off of the power to the shaft 64, is that in which the heads 42 and 43 are relatively widely separated, the spindles 179 with the parts carried thereby are withdrawn to the position shown in Figs. 1, 2, 3, 4, 6, 7, and 8; the mechanisms for feeding the cutters 75 are in the position shown of the one in Fig. 22; the lever 265 is in neutral position, namely, that in which the clutch-member 271 is out of engagement with both gears 277 and 278, and the clutch lever 290 is in neutral position wherein neither gear 280 nor 282 is clutched to shaft 281, the lever-actuating fingers 213 and the parts connected therewith, in this position of the machine occupying the position shown of the one in dotted lines in Fig. 10.

With the machine thus positioned, the shaft 74, the ends of which are to be cut off, to cause the shaft to be of a predetermined length and then bored at its ends to form center-holes, is introduced into the space between the chucks 61, and where the shaft to be cut is relatively heavy, the shaft is placed upon shaft-rests, or saddles, 327 provided on the upper ends of threaded rods 328 vertically adjustable on cross-bars 329 slidable along the guides 41 to adjusted position thereon (Fig. 5), the ends of the shaft 74 registering with the longitudinally-extending openings in the chucks 61. The operator then, through the medium of the hand-lever 290, shifts the clutch-device 283 to the left in Fig. 29, to clutch the gear 280 to the drive-shaft 281, and then by means of the handle 237 shifts the rod formed of the sections 233 and 233ª to the right, viewing the machine as it is viewed in Fig. 2, which clutches the gear 277 to the shaft 275 through the medium of the clutch-member 271, thereby causing the shafts 51 and 52 to be rotated in clockwise direction in Figs. 21 and 22 from the shaft 281, with the result of causing, by the rotation of the threaded portions 51ª and 52ª thereof in the threaded lugs 47 and 48, the simultaneous and uniform movement of the heads 42 and 43 toward each other along the guides 41, these heads continuing their movement until the lug 235 in striking the stop 238 on rod-section 233, shifts the rod formed of this rod-section and the rod-section 233ª to the left, viewing the machine as it is viewed in Fig. 2, to a position in which the clutch 271 is in neutral position in which position the shaft 275 is disconnected from the driving means and therefore comes to rest, the latch 262 in this position of the parts automatically dropping into the groove 263 and thereby preventing the further shifting of the rod-section 233ª and consequently the clutch-member 271, until this latch is released from the groove 263. The purpose of the mechanism just described is that of moving the chuck devices 61, as also all of the other mechanism carried by the heads 42 and 43, to a position in which the ends of the shaft 74 project a slight distance beyond the outer ends of the chucks 61 and the cutting mechanisms and center-hole-forming mechanisms are moved to a position in which, when they are operated, the shaft is cut to the desired predetermined length and the center-holes are bored to the desired predetermined depth. Inasmuch, however, as the momentum of the moving parts might cause a certain amount of over-run and prevent the accurate automatic positioning of the parts just described, it is preferred that the frame 40 of the machine be provided with a stop device 330 in the form of a threaded rod screwed into a threaded opening 331 in a lug 332 secured to the frame of the machine, as by a screw 333 and dowel 334 adapted to enter, respectively, any of the openings 335 and 336 provided in the side of the frame 40, the stop 330 co-operating with a stop-member 337, shown as a screw 338, screwed into the end of the head 43. The part 330 in use is so adjusted that when the member 337 engages it, the heads 42 and 43 will be accurately spaced apart the desired distance, and the stop device 238 is so adjusted that the lug 235 will engage it and shift the rod formed of the sections 233 and 233ª to a position for throwing the clutch 271 to neutral position, before the stop-member 337 engages the stop 330. Following the movement of the clutch 271 to neutral position by the automatic operation stated, the operator rotates the shafts 51 and 52 by hand sufficiently to cause the stop-member 337 to engage the stop 330, as by means of a rod introduced, in succession, as the turning progresses, into openings 339 in the coupling 276. In this manual rotation of the feed-screws 51ª and 52ª, the rod-section 233 is forced to the left in the drawings, by the continuance of the engagement of the lug 235, in its movement to the left, with the stop 238, and as the rod-section 233ª is held against lengthwise movement by the latch 262, the coupling 250 shifts to the left in Fig. 17, relative to the rod-section 233ª, to the position shown in Fig. 19, it being understood that the springs 257 are sufficiently stiff to hold the connector 250 in the position shown in Fig. 17, for causing the rod-sections 233 and 233ª to shift as a unitary structure, up to the point where the lever 262ᵇ interlocks with the wall of the groove 263.

The operator then tightens up the chucks 61 to firmly grip the shaft 74 therein and then to start the cutting operation, swings the lever 290 to a position in which the gear 282 is clutched to the drive shaft 281, thereby driving the shaft 292 and the gears thereon, the one of these gears which is in mesh with the gear 295, 296, or 297, that is clutched to the shaft 298 by the key 302, driving this shaft 298 and this shaft driving the shaft 323 and consequently the shaft 64, through the medium of the gear mechanism interposed between the shafts 298 and 323 as described, the speed at which the shaft 64 is driven being regulated by the adjustment of the sliding keys 302 and 312, as will be understood from the foregoing description. Rotation of the shaft 64 which is in anti-clockwise direction in Fig. 12, rotates, through the medium of the pinions 63 and gears 62, the rotary chucks 61 thereby rotating the shaft 74. The operator by grasping the knobs 90 and pulling outwardly thereon, namely, to the right in Figs. 22 and 24, shifts the hollow shafts 81, the rods 109 and 106, disks 117, collars 134 and clutch-members 92 to the right in Figure 22 to a position in which the clutches 92 engage at their teeth 94 with the teeth 96 of the respective sleeves 104 which are being constantly driven from the shafts 138 through the medium of the gears hereinbefore described, the shafts 138 being continuously driven from the shaft 64 by means of the worms 142 and worm-wheels 141. The manipulation of the parts, as stated, causes the shafts 81 to be driven from the sleeves 104, and with them the threaded shafts 79 in a direction to move the carriages 70 to the left in Fig. 22, viz., in a direction toward the work 74, by the action of the shafts 79 rotating at their threaded portions in engagement with the threads 73 of the nuts 71 on these carriages, and thus feeding the tools 75 into engagement with, and into, the work 74, cutting off the opposite ends thereof to cause the work to be of the desired length. The movement of the carriages 70 as stated, operates to move to the left in Fig. 22, the sleeve members 123 carried by the lugs 121 on these carriages, the flanged portions 126 of these sleeves engaging the shoulder portions 130 of the levers 128 and becoming inter-locked therewith as illustrated in Fig. 23, this figure and Fig. 24 showing the parts of the structure now being described in the positions they assume when the cutting tools 75 are almost at the end of their inward, cutting, movement. Further movement of the shafts 81 and the other parts as stated, to the left in Figs. 23 and 24, cause the pins 125 to ride against the cam surfaces 131 and rock the levers 128 out of engagement at their shoulders 130 with the members 123 and thereupon permit the springs 127, which have become compressed during the interval between the beginning of the engagement of the members 123 with the shoulders 130 and the release of the levers 128 therefrom by the engagement therewith of the pins 125 as stated, to forcibly drive the members 123 to the left in Fig. 23, causing them to strike the collars 134 and shift the shafts 81 to the left in Fig. 23 to a position in which the clutch members 92 dis-engage from the sleeves 104 and become clutched to the gears 98 (Fig. 21), with the result of driving the shafts 81 in a reverse direction which causes the threaded shafts 79 to rotate in the nuts 71 in a direction for shifting the carriages 70 carrying the tools 75, to the right in Fig. 21 for withdrawing the tools from the work, this movement of the parts, as stated, continuing until the pins 120 on the carriages 70, by engaging the cam surfaces 119 of the respective rotating cam devices 117, in the outward movement of the carriages, forces the hollow shafts 81 to a position for moving the clutch-devices 92 into neutral position, the position of the parts just described at this stage of the operation, being that represented in Fig. 22 of the construction on the head 42.

As the carriages 70 begin their inward movement for performing the cutting operations stated, the levers 207 co-operating with the two spindle devices 179, respectively, occupy the position shown in Fig. 8 and by dotted lines in Fig. 10, and the fingers 213 co-operating therewith occupy the position shown by dotted lines in Fig. 10, the rollers 225 bearing against the cam surfaces 232 of the cams 229. As the carriages 70 move inwardly, the cams 229 carried thereby likewise move inwardly, or, in other words, in a direction opposite that of the arrow in Fig. 9, and by the time these carriages have completed their inward movement, the portions 230 of these cams oppose the rollers 225 in which position the springs 223 have retracted the sliding members 216 and the fingers 213 carried thereby to the position shown of the one in Figs. 8 and 9, in which position the teeth 214 of these fingers interlock with the recesses 211 of the respective levers 207. Shortly after the carriages 70 start on their outward movement, to withdraw the tools 75 from the work after the ends of the shaft have been cut, the abrupt cam-surfaces 231 are moved in the direction of the arrow in Fig. 9, by the movement of the carriages 70, into engagement with the opposing rollers 225 and thereafter the cam surfaces 232 are moved into engagement with these rollers, thereby forcing the sliding members 216 and the fingers 213 carried thereby toward the respective levers 207 with the result of swinging the levers 207 at their upper ends toward the respective spindles 179 and thus projecting the spindles 179 and their drills 188 toward the opposite ends of the work 75, in opposition to the coiled springs 197. The initial movement of these spindles, by reason of the provision of the abrupt cam surfaces 231, is relatively rapid to a point where the drills 188 extend closely adjacent to the ends of the work, and the rest of the movement of the spindles 179 inwardly, during which time the drills 188 are performing the drilling function, is relatively slow by reason of the provision of the long tapering surfaces 232 of the cams 229. Shortly before the carriages 70 have completed their outward movement, the cam surfaces 220 of the fingers 213 engage the respective devices 221, and by the forcing of these fingers 213 downwardly against the action of the springs 218, disengage these fingers from the levers 207 thereby permitting the springs 197 to return the spindles 179, together with the drills 188, to normal position (Fig. 8), thus withdrawing them from the work. The operator then shifts the lever 290 to a position in which the clutch controlled thereby is in neutral position and the shaft 64 ceases to rotate. The operator then loosens the chucks 61 on the work and then lifts the latch-lever 262$^a$ out of engagement with the groove 263, and by means of the handle 237, shifts the rod formed of the sections 233 and 233$^a$ to the left in Fig. 2, thereby clutching the clutch-member 272 to the gear 278 for driving the shafts 51 and 52 from the drive shaft 281 in a direction for moving the heads 42 and 43 simultaneously away from each other along the guides 41 on the machine. The heads 42 and 43 continue to move away from each other as stated, until the lug 235 in moving to the right in Fig. 2 engages the stop 239 and shifts the rod formed of the sections 233 and 233$^a$ to the right to a position in which the clutch 271 is in neutral position, whereupon the heads come to rest in properly spaced position for permitting of the removal of the finished shaft and the repositioning in the machine of another shaft to be operated on.

It will be understood from the foregoing that by rotating the knobs 111, the cam collars 117 may be adjusted lengthwise of the hollow shafts 81 with which they respectively co-operate whereby the stroke of the cutters 75 may be adjusted at will, for operating on shafts of different sizes.

In accordance with the particular arrangement illustrated wherein the spindles 179 are rotated in the same direction from the shaft 64, the cutting edges 189 of the drills 188 for drilling the center-holes in the ends of the shaft, are provided as rights and lefts, respectively, as these tools in the boring operation move toward each other in penetrating the ends of the shaft.

The arrangement illustrated in Figs. 32 and 33 is provided for use where the shafts to be operated on are of relatively short lengths. In this arrangement the shaft is held in one chuck only during the cutting operation, by preference there being two chucks suitably constructed for this purpose whereby two shafts are operated on at the same time. A chuck suitable for this purpose is represented in Fig. 33, this chuck, which is generally of the same construction as the chucks 61 of the preceding figures, except that the shaft-clamping mechanism is duplicated at its opposite end, comprising the hollow rotatable member 402 which is equipped at one end with the radially movable shaft-clamping jaws 403 formed with racks 404 meshing with a spiral 405 formed on the face of a ring 406 rotatable about the member 402 through the medium of a ring-gear 407 secured thereto and meshing at its teeth with pinions 408 journaled in a ring member 409 secured to the member 402, the pinions 408 being accessible for turning at their angularly socketed portions 410, through the face of the ring 409. The member 402 is journaled in the housing 411 which corresponds with the housing 58 of Fig. 4, and carries a gear 412 corresponding to the gear 62 of Fig. 12 which meshes with a pinion 413 corresponding with pinion 63 of this figure, and carried by the shaft 64, whereby the chuck device is rotated for rotating the work. The end of the member 402 opposite that equipped with the jaws 403, is telescoped with a hollow cylindrical member 414 rigidly secured thereto in any suitable way, as by set-screws 416 and carrying radially adjustable jaws 415 constructed and operated as explained of the jaws 403.

In this arrangement the shafts to be cut and to be formed with center-holes, are operated on at one end only in one of the chuck devices, to cut one end and form a center-hole therein, as for example the one at the left hand side of Fig. 32, and then shifted to the other chuck device to be cut off to the desired length and have a center-hole formed in its other end, the mechanisms carried by the heads 42 and 43 operating simultaneously as explained of the construction of the preceding figures. The chuck on the head 43 carries a stop 417 extending into a position to be engaged by the finished end of the shaft in positioning it in the chuck of head 43 and by which the cutting of the shaft to the desired length may be accurately gauged.

While I have illustrated and described a particular embodiment of my invention I do not wish to be understood as intending to limit it thereto as the same may be variously modified and altered without departing from the spirit of my invention.

What I claim as new and desire to secure by Letters Patent is:—

1. In a machine of the character set forth, the combination of means for supporting the work, a device for cutting off an end of the work, a device for forming a center-hole therein, means operating automatically for actuating said devices in succession to effect the cutting off of the end of the work and the forming of a center-hole therein and means operating automatically to discontinue the movement of said devices after each successive operation thereof.

2. In a machine of the character set forth, the combination of means for supporting the work, a device for cutting off an end of the work, a device for forming a center-hole therein, means operating automatically for actuating said devices in succession first to cut off an end of the work and thereafter form a center-hole therein and means operating automatically to discontinue the movement of said devices after each successive operation thereof.

3. In a machine of the character set forth, the combination of means for rotating the work, a device for cutting off an end of the work, a device for forming a center-hole therein, means operating automatically for actuating said devices in succession first to cut off an end of the work and thereafter form a center-hole therein and means operating automatically to discontinue the movement of said devices after each successive operation thereof.

4. In a machine of the character set forth, the combination of means for supporting the work, devices for cutting off both ends of the work, devices for forming center-holes therein, and means operating automatically for actuating said devices in succession to effect the cutting off of the ends of the work and the forming of center-holes therein.

5. In a machine of the character set forth, the combination of means for supporting the work, devices for cutting off both ends of the work, devices for forming center-holes therein, and means operating automatically for actuating said devices in succession and to effect first the cutting off of the ends of the work and thereafter the forming of center holes therein.

6. In a machine of the character set forth, the combination of means for rotating the work, devices for cutting off both ends of the work, devices for forming center-holes therein, and means operating automatically for actuating said devices in succession to effect the cutting off of the ends of the work and the forming of center-holes therein.

7. In a machine of the character set forth, the combination of means for supporting the work, a device operating when actuated to operate against an end of the work, a tool for forming a center-hole in the end of the work, and means operating automatically to cause said device to operate against an end of the work and engage said boring tool with the work to form a center-hole therein.

8. In a machine of the character set forth, the combination of means for supporting the work, means for cutting an end of the work, and means operated by said second-named means for forming a center-hole in the said end of the work.

9. In a machine of the character set forth, the combination of means for supporting the work, means for cutting an end of the work involving a cutter movable toward and away from the work, and means operated automatically by the movement of said second-named means for forming a center-hole in the work.

10. In a machine of the character set forth, the combination of means for supporting the work, means for cutting an end of the work involving a cutter movable toward and away from the work, a center-hole-forming tool mounted to move toward and away from the work in a direction lengthwise thereof, and cam means operated by said second-named means for automatically actuating said center-hole-forming tool.

11. In a machine of the character set forth, the combination of means for supporting the work, means for cutting an end of the work involving a cutter movable toward and away from the work to cut an end thereof, a center-hole-forming tool mounted to move toward and away from the work in a direction lengthwise thereof, spring means for forcing said tool in one direction, and cam means operated by said second-named means for automatically forcing said tool in the opposite direction.

12. In a machine of the character set forth, the combination of means for supporting the work, means for cutting an end of the work, and means operated by said second-named means for forming a center-hole in the said end of the work.

13. In a machine of the character set forth, the combination of means for rotating the work, means for cutting an end of the work, and means operated by said second-named means for forming a center-hole in the said end of the work.

14. In a machine of the character set forth, the combination of means for supporting the work, means for cutting the ends of the work, and means operated by said second-named means for forming center-holes in the ends of the work.

15. In a machine of the character set forth, the combination of means for supporting the work, means for cutting the ends of the work involving cutters movable toward and away from the work and positioned to cut the ends of the latter, and means operated automatically by said last-named means for forming center-holes in the opposite ends of the work.

16. In a machine of the character set forth, the combination of means for supporting the work, means for cutting the ends of the work involving cutters movable toward and away from the work and positioned to cut the ends of the latter and means operated automatically by the movement of said second named means to form center-holes in the opposite ends of the work following the operation of cutting the ends of the work by said second-named means.

17. In a machine of the character set forth, the combination of means for supporting the work, means for cutting the ends of the work involving cutters movable toward and away from the work and positioned to cut the ends of the latter, tools mounted to be moved toward the work for forming center-holes in the ends of the work, and means operated automatically by the movement of said last-named means to project said tools against the ends of the work to form the center-holes therein.

18. In a machine of the character set forth, the combination of means for supporting the work, means for cutting the ends of the work involving cutters movable toward and away from the work and positioned to cut the ends of the latter, tools mounted to be moved toward the work for forming center-holes in the ends of the work, and means operated automatically by the movement of said second-named means to project said tools into the ends of the work to form the center-holes therein.

19. In a machine of the character set forth, the combination of means for supporting the work, means for cutting an end of the work involving a cutter movable toward and away from the work, a tool adapted to be projected against the end of the work to form a center-hole therein, and means operating automatically first to cause said cutter to cut an end of the work and thereafter withdraw said cutter from the work and following the beginning of the operation of withdrawing the cutter from the work, forcing said tool into the end of the work to form the center-hole.

20. In a machine of the character set forth, the combination of means for supporting the work, means for cutting the ends of the work involving cutters movable toward and away from the work and positioned to cut the ends of the latter, tools mounted to be moved toward the work for forming center-holes in the ends of the work, and means operating automatically to cause said cutters simultaneously to cut the ends of the work and thereafter withdraw them from the work, and following the beginning of the withdrawal operation of the cutters simultaneously projecting said tools into engagement with the ends of the work to form the center-holes therein.

21. In a machine of the character set forth, the combination of heads relatively movable toward and away from each other, means carried by said heads for supporting the work, cutting mechanisms carried by said heads for cutting the opposite ends of the work, said cutting mechanisms being movable on said heads, mechanisms carried by said heads and movable thereon for forming center-holes in the ends of the work, and means operating automatically to actuate said mechanisms.

22. In a machine of the character set forth, the combination of heads relatively movable toward and away from each other, means carried by said heads for supporting the work to render the ends of the latter accessible to be operated on, cutting mechanisms carried by said heads for cutting the opposite ends of the work, said cutting mechanisms being movable on said heads, and mechanisms carried by said heads and movable thereon for forming center-holes in the ends of the work.

23. In a machine of the character set forth, the combination of a support, a pair of work-supporting members supported thereon and relatively movable toward and away from each other, and means for producing relative movement of said members lengthwise of said support operating automatically to discontinue such movement when a predetermined position is reached.

24. In a machine of the character set forth, the combination of a support, a pair of work-supporting members supported thereon and movable toward and away from each other, and means for producing relative movement of said members lengthwise of said support operating automatically to discontinue such movement when a predetermined position is reached.

25. In a machine of the character set forth, the combination of a support, a pair of work-supporting members supported thereon and relatively movable toward and away from each other, power means, means operated by said power means for producing relative movement of said members lengthwise of said support, and means operating automatically to discontinue such movement when said members have reached a predetermined position.

26. In a machine of the character set forth, the combination of a support, a pair of work-supporting members supported thereon and movable toward and away from each other, power means, means operated by said power means for producing relative movement of said members lengthwise of said support, and means operating automatically to discontinue such movement when said members have reached a predetermined position.

27. In a machine of the character set forth, the combination of a support, a pair of members supported thereon and relatively movable toward and away from each other, and means for producing relative movement of said members toward and away from each other lengthwise of said support, operating automatically to discontinue such movements when predetermined positions in such movements, are reached.

28. In a machine of the character set forth, the combination of a support, a pair of members supported thereon and relatively movable toward and away from each other, and means for effecting relative movement of said members and operating automatically to cause said members to assume a predetermined position relative to each other.

29. In a machine of the character set forth, the combination of a support, a pair of members supported thereon and relatively movable toward and away from each other, and means for effecting relative movement of said members both toward and away from each other and operating automatically to cause said members to assume predetermined positions relative to each other both in the adjustment toward and away from each other.

30. In a machine of the character set forth, the combination of a support, a pair of work-supporting members supported thereon and relatively movable toward and away from each other, power means, means operated by said power means for effecting relative movement of said members, both toward and away from each other, and means operating automatically to cause said members to assume predetermined positions relative to each other both in the adjustment toward and away from each other.

31. In a machine of the character set forth, the combination of a support, a pair of members supported thereon and movable toward and away from each other, means on said members for holding work, and means operatively connected with said members and by the actuation of which both of said members are moved relative to each other.

32. In a machine of the character set forth, the combination of a support, a pair of members supported thereon and movable toward and away from each other, means on said members for holding work, rotatable means having threaded engagement with said members and operating when rotated in one direction to move said members toward each other and when rotated in the opposite direction to move said members in the opposite direction, and means for rotating said rotatable means.

33. In a machine of the character set forth, the combination of a support, a pair of members supported thereon and movable toward and away from each other, rotatable means having threaded engagement with said members and operating when rotated in one direction to move said members toward each other and when rotated in the opposite direction to move said members in the opposite direction, and means for rotating said rotatable means, operating automatically to discontinue rotation of said rotatable means when said members assume a predetermined position.

34. In a machine of the character set forth, the combination of a support, a pair of members supported thereon and relatively movable toward and away from each other, means for producing relative movement of said members lengthwise of said support, and means involving a shifter-device operating automatically to arrest the operation of said last-named means when said members assume a predetermined position relative to each other lengthwise of the machine.

35. In a machine of the character set forth, the combination of a support, a pair of work-supporting devices supported thereon and relatively movable toward and away from each other, and means for producing relative movement of said devices lengthwise of said support operating auotmatically to discontinue such movement when a predetermined position is reached.

36. In a machine of the character set forth, the combination of a support, a pair of work-supporting devices supported thereon and relatively movable toward and away from each other, and means for effecting relative movement of said devices and operating automatically to cause said devices to assume a predetermined position relative to each other.

37. In a machine of the character set forth, the combination of a support, a pair of tool-equipped devices supported thereon and relatively movable toward and away from each other, and means for producing relative movement of said devices lengthwise of said support operating automatically to discontinue such movement when a predetermined position is reached.

38. In a machine of the character set forth, the combination of a support, a pair of tool-equipped devices supported thereon and relatively movable toward and away from each other, and means for effecting relative movement of said devices and operating automatically to cause said devices to assume a predetermined position relative to each other.

39. In a machine of the character set forth, the combination of work-holding means constructed and arranged to support the work therein with the ends of the work accessible for operation thereon at the opposite ends of said work-holding means, and comprising a pair of members relatively movable toward and away from each other, and means for operating on the ends of the work, connected with said members, respectively, for movement therewith.

40. In a machine of the character set forth, the combination of work-holding means constructed and arranged to support the work therein with the ends of the work accessible for operation thereon at the opposite ends of said work-holding means, and comprising a pair of members relatively movable toward and away from each other, and means connected with said members, respectively, for movement therewith and movable relative thereto, for operating on the ends of the work.

41. In a machine of the character set forth, the combination of work-holding means constructed and arranged to support the work therein with the ends of the work accessible for operation thereon at the opposite ends of said work-holding means, and comprising a pair of members relatively movable toward and away from each other, and cutting devices connected with said members, respectively, for movement therewith and extending angularly relative to the work for operating on the ends of the work.

42. In a machine of the character set forth, the combination of work-holding means constructed and arranged to support the work therein with the ends of the work accessible for operation thereon at the opposite ends of said work-holding means, and comprising a pair of members relatively movable toward and away from each other, and cutting devices connected with said members, respectively, for movement therewith and extending angularly relative to the work and movable relative to said members, for operating on the ends of the work.

43. In a machine of the character set forth, the combination of work-holding means constructed and arranged to support the work therein with the ends of the work accessible for operation thereon at the opposite ends of said work-holding means, and means located at opposite ends of said work-holding means for cutting off the ends of the work and forming center-holes therein, 44. In a machine of the character set forth, the combination of work-holding means constructed and arranged to support the work therein with the ends of the work accessible for operation thereon at the opposite ends of said work-holding means, and comprising a pair of members relatively movable toward and away from each other, and means located at opposite ends of said work-holding means for cutting off the ends of the work and forming center-holes therein.

45. In a machine of the character set forth, the combination of work-holding means constructed and arranged to support the work therein with the ends of the work accessible for operation thereon at the opposite ends of said work-holding means, and located at opposite ends of said work-holding means for cutting off the ends of the work and forming center-holes therein, said means for cutting off the ends of the work being movable in a direction crosswise of the work and said center-hole-forming means being movable toward and away from each other in a direction lengthwise of the work.

46. In a machine of the character set forth, the combination of work-holding means constructed and arranged to support the work therein with the ends of the work accessible for operation thereon at the opposite ends of said work-holding means, and comprising a pair of members relatively movable toward and away from each other, and means located at opposite ends of said work-holding means for cutting off the ends of the work and forming center-holes therein, said means for cutting off the ends of the work being movable in a direction crosswise of the work and said center-hole-forming means being movable toward and away from each other in a direction lengthwise of the work.

47. In a machine of the character set forth, a combination of work-holding means constructed and arranged to support the work therein with the ends of the work accessible for operation thereon at the opposite ends of said work-holding means, and comprising a pair of members relatively movable toward and away from each other, and means for cutting off the ends of the work and forming center-holes therein, each of said members having connected therewith, one of said means for cutting off an end of the work and one of said means for forming center-holes therein.

48. In a machine of the character set forth, the combination of work-holding means constructed and arranged to support the work therein with the ends of the work accessible for operation thereon at the opposite ends of said work-holding means, and comprising a pair of members relatively movable toward and away from each other, and means for cutting off the ends of the work and forming center-holes therein, each of said members having connected therewith, to be movable relative thereto, one of said means for cutting off an end of the work and one of said means for forming center-holes therein.

49. In a machine of the character set forth, the combination of work-holding means constructed and arranged to support the work therein with the ends of the work accessible for operation thereon at the opposite ends of said work-holding means, and comprising a pair of members relatively movable toward and away from each other, devices for cutting off the ends of the work movable crosswise of the work, and devices for forming center-holes therein, movable lengthwise of the work, each of said members having connected therewith, to be movable relative thereto as stated, one of each of said devices.

50. In a machine of the character set forth, the combination of work-holding means constructed and arranged to support the work therein with the ends of the work accessible for operation thereon at the opposite ends of said work-holding means, and comprising a pair of members relatively movable toward and away from each other and having rotatable parts at which the work is engaged, means for rotating said rotatable parts in any position of the relative adjustment of said members, and means located at opposite ends of said work-holding means for operating on the ends of the work.

51. In a machine of the character set forth, the combination of work-holding means constructed and arranged to support the work therein with the ends of the work accessible for operation thereon at the opposite ends of said work-holding means, and comprising a pair of members relatively movable toward and away from each other and having rotatable parts at which the work is engaged, means for rotating said rotatable parts in any position of the relative adjustment of said members, means connected with said members, respectively, for movement therewith and movable relative thereto, for operating on the ends of the work, and means operating to actuate said last-named means in any position of their relative adjustment with said means.

52. In a machine of the character set forth, the combination of work-holding means constructed and arranged to support the work therein with the ends of the work accessible for operation thereon at the opposite ends of said work-holding means, and comprising a pair of members relatively movable toward and away from each other and having rotatable parts at which the work is engaged, means for rotating said rotatable parts in any position of the relative adjustment of said members, devices connected with said members, respectively, for movement therewith and movable crosswise of said work for cutting the ends of the work, devices connected with said members, respectively, for movement therewith and movable thereon in the direction of the length of the work, for forming center-holes in the work, and means operating to actuate said first and second named devices in any position of their relative adjustment with said members.

53. In a machine of the character set forth, the combination of work-holding means constructed and arranged to support the work therein with the ends of the work accessible for operation thereon at the opposite ends of said work-holding means and comprising a pair of members relatively movable toward and away from each other, devices movably supported on said members, respectively, for operating on the ends of the work, and means, engaging said members, operating automatically to move said devices relative to said members and the work.

54. In a machine of the character set forth, the combination of work-holding means constructed and arranged to support the work therein with the ends of the work accessible for operation thereon at the opposite ends of said work-holding means, and comprising a pair of members relatively movable toward and away from each other, devices movably supported on said members, respectively, for operating on the ends of the work, and means, engaging said members, operating automatically in any position of their relative adjustment with said members, to move said devices relative to said members and the work.

55. In a machine of the character set forth, the combination of work-holding means constructed and arranged to support the work therein with the ends of the work accessible for operation thereon at the opposite ends of said work-holding means, and comprising a pair of members relatively movable toward and away from each other and having rotatable parts at which the work is engaged, means for rotating said rotatable parts in any position of the relative adjustment of said members, devices movably supported on said members respectively for movement therewith, for operating on the ends of the work, and means engaging said members, operating automatically to move said devices relative to said members and the work.

56. In a machine of the character set forth, the combination of a support, a work-holding member adjustable along said support and means automatically movable for operating on the work connected with said member and movable thereon.

57. In a machine of the character set forth, the combination of a support, a work-holding member adjustable along said support, a device operating on the work, connected with said member and movable thereon, and means engaging said member and movable therewith in the adjustment of the latter for actuating said device.

58. In a machine of the character set forth, the combination of a support, a member adjustable along said support and having a rotatable part for holding work, and means for operating on the work connected with said member and movable thereon.

59. In a machine of the character set forth, the combination of a support, a member adjustable along said support and having a rotatable part for engaging work, a device for operating on the work connected with said member and movable thereon, and means engaging said member and movable therewith in the adjustment of the latter for actuating said device.

60. In a machine of the character set forth, the combination of a support, a work-holding member adjustable along said support, a cutter for cutting an end of the work and connected with said member and movable thereon, and a center-hole-forming tool connected with said member and movable thereon.

61. In a machine of the character set forth, the combination of a support, a work-holding member adjustable along said support, a device for operating on the work connected with said member and movable thereon, to cut an end of the work, a device connected with said member and movable thereon for forming a center-hole in the end of the work, and means engaging said member and movable therewith in the adjustment of the latter for actuating said devices.

62. In a machine of the character set forth, the combination of a support, a work-holding member adjustable along said support and having a rotatable part at which the work is engaged, means for rotating said rotatable part in any position of the adjustment of said member, and means for operating on the work connected with said member and movable thereon.

63. In a machine of the character set forth, the combination of a support, a work-holding member adjustable along said support and having a rotatable part at which the work is engaged, means for rotating said rotatable part in any position of the adjustment of said member, means connected with said member for movement therewith and movable relative thereto, for operating on an end of the work, and means operating to actuate said last-named means in any position of their relative adjustment with said member.

64. The combination of a support, means for supporting work thereon, a tool-holding device supported to be moved toward and away from the work, a rock-lever for moving said device toward the work, means tending to move said device in one direction, and means for rocking said lever in the opposite direction arranged to automatically disengage from said lever after operating the latter and permit said first-named means to operate.

65. The combination of a support, means for supporting work thereon, a tool-holding device supported to be moved toward and away from the work, a rock-lever for moving said device toward the work, means tending to move said device away from the work, and means for rocking said lever in the opposite direction arranged to automatically disengage from said lever for operating the latter and permit said first-named means to operate.

66. The combination of a support, means for supporting work thereon, a tool-holding device supported to be moved toward and away from the work, means tending to move said device in one direction, and means for moving said device in the opposite direction operating automatically upon actuating said device to permit said first-named means to operate on said device and move it in the opposite direction.

67. The combination of a support, means for supporting work thereon, a tool-holding device supported to be moved toward and away from the work, a rock-lever for moving said device toward the work, a reciprocable member, and a finger pivotally connected with said member and adapted in the movement of the latter in one direction to shift said lever and thereafter automatically disengage therefrom, for the purpose set forth.

68. The combination of a support, means for supporting work thereon, tool-holding mechanism involving a tool-supporting element movable toward and away from the work, means tending to move said element in one direction, and means for operating said mechanism to move said element in opposition to said second-named means operating during a portion only of its movement to effect said movement of said element and thereafter permitting said element to be returned by said second-named means.

69. The combination of a support, means for supporting work thereon, tool-holding mechanism involving a tool-supporting element movable toward and away from the work, means tending to move said element in one direction, a rock-lever for moving said element toward the work, and a member adapted, in its movement to engage said rock-lever during a portion only of the movement of said member, and thereafter permitting said element to be returned by said second-named means.

70. The combination of a support, means for supporting work thereon, a tool-holding device supported to be moved toward and away from the work, a shiftable member for moving said device toward the work, means tending to move said device in one direction, and a reciprocable member for shifting said first referred to member in the opposite direction.

71. The combination of a support, means for supporting work thereon, a tool-holding device supported to be moved toward and away from the work, a shiftable member for moving said device toward the work, and a rocking-reciprocable member adapted in its movement in one direction, to actuate said shiftable member.

72. The combination of a support, means for supporting work thereon, tool-holding mechanism involving a tool-supporting element movable toward and away from the work, means tending to move said element in one direction, a shiftable member for moving said element toward the work, and means operating to move said shiftable member in opposition to said second-named means, operating during a portion only of its movement, to actuate said shiftable member, and thereafter permit said element to be returned by said second-named means.

73. The combination of a support, means for supporting work thereon, tool-holding mechanism involving a tool-supporting element movable toward and away from the work, means tending to move said element in one direction, and reciprocable means for operating said mechanism to move said element in opposition to said second-named means operating during a portion only of its movement to effect said movement of said element and thereafter permitting said element to be returned by said second-named means.

74. The combination of a support, means for supporting work thereon, tool-holding mechanism involving a tool-supporting element movable toward and away from the work, means tending to move said element in one direction, said mechanism presenting a shouldered portion, and means for operating said mechanism to move said element in opposition to said second-named means releasably engaging said mechanism at said shouldered portion, and operating during a portion only of its movement to actuate said mechanism to effect the movement of said element, and thereafter permitting said element to be returned by said second-named means.

75. The combination of a support, means for supporting work thereon, a tool-holding device supported to be moved toward and away from the work, a shiftable member for moving said device toward the work, a second shiftable member, and a finger pivotally connected with said last-named member and adapted in the movement of the latter in one direction to shift said first-named member and thereafter automatically disengage therefrom, for the purpose set forth.

76. The combination of a support, means for supporting work thereon, a tool-holding device supported to be moved toward and away from the work, a shiftable member for moving said device, a second shiftable member, and a finger pivotally connected with said second-named member and adapted in the movement of the latter in one direction to shift said first-named member, and means for disengaging said finger from said first-named member in the movement of said second-named member.

77. The combination of a support, means for supporting work thereon, a tool-holding device supported to be moved toward and away from the work, a shiftable member for moving said device, a second shiftable member, a finger pivotally connected with said second-named member and adapted in the movement of the latter in one direction to shift said first-named member, and means for disengaging said finger from said first-named member in the movement of said second-named member, said means including a cam surface on said finger and a relatively stationary part engageable by said cam surface.

78. The combination of a support, means for supporting work thereon, a tool-holding device supported to be moved toward and away from the work, a shiftable member for moving said device, a second shiftable member, a finger pivotally connected with said second-named member and adapted to engage said first-named member in its movement in one direction for shifting the latter, a spring tending to hold said finger in a position to engage said first named member, and means operating automatically to disengage said finger from said first-named member in the movement of said second-named member.

79. The combination of a support, means for supporting work thereon, a tool-holding device mounted to rotate and movable toward and away from the work, a spring surrounding said tool-holding device and operating to move the latter away from the work, a rock-lever engaging at one end thereof with said tool-supporting member and through the medium of which the latter is moved toward the work, a reciprocable member, a finger pivoted on said reciprocable member, a spring tending to hold said finger in one position in which it opposes the other end of said lever and through the medium of which said rock-lever is actuated, said finger being provided with a cam surface cooperating with a relatively stationary part and operating when engaging said part, to shift said finger, during the movement of said reciprocable member, out of engagement with said rock-lever, to permit said tool-supporting-member to be returned under the action of said spring, and a cam device operating crosswise of said reciprocable member for actuating the latter.

80. The combination of a work support having means for engaging work, a tool-holding device movable toward and away from the work, means tending to move said device away from the work, and means for actuating said device involving mechanism which operates said device toward the work and thereupon releases said device for return under the action of said second-named means, said last-named means being adjustable for varying the extent of penetration of the tool into the work.

81. The combination of a support, means for supporting work thereon, tool-holding mechanism involving a tool-supporting element movable toward and away from the work, means tending to move said element in one direction, and means for operating said mechanism to move said element in opposition to said second-named means operating through a portion only of its movement to effect said movement of said element and thereafter permitting said element to be returned by said second-named means, said last-named means being adjustable to vary the extent of movement of said element.

82. The combination of a support, means for supporting work thereon, a tool-holding device supported to move toward and away from the work, a rock-lever for moving said device toward the work, means tending to move said device in one direction, and means operating automatically to actuate said rock-lever in opposition to said first-named means, said last-named means being adjustable to vary the extent of the rocking of said lever.

83. The combination of a support, means for supporting work thereon, a tool-holding device supported to be moved toward and away from the work, a shiftable member for moving said device toward the work, means tending to move said device in one direction, and means for shifting said member in the opposite direction arranged to automatically disengage from said member for operating the latter and permit said first-named means to operate, said last-named means being adjustable for varying the time of disengagement of said last-named means from said shiftable member to vary the stroke of said device.

84. The combination of a support, means for supporting work thereon, a tool-holding device supported to be moved toward and away from the work, a rock-lever for moving said device toward the work, means tending to move said device in one direction, and means for rocking said lever in the opposite direction arranged to automatically disengage from said lever for operating the latter and permit said first-named means to operate, said last-named means being adjustable for varying the time of disengagement of said last-named means from said rock member to vary the stroke of said device.

85. The combination of a support, means for supporting work thereon, a tool-holding device supported to be moved toward and away from the work, and means for moving said device toward and away from the work involving a rotatable, threaded, member threaded into said device, a second member rotatable with said first-named member, said members being relatively movable longitudinally, reversible clutch means one of the elements of which is operatively engaged with said second member, and means for shifting said second member to effect reversal of the movement of said device.

86. The combination of a support, means for supporting work thereon, a tool-holding device supported to be moved toward and away from the work, and means for moving said device toward and away from the work involving a rotatable, threaded, member threaded into said device, a second member rotatable with said first-named member, said members being relatively movable longitudinally, reversible clutch means one of the elements of which is carried by said second member, and means for shifting said second member to effect reversal of the movement of said device.

87. The combination of a support, means for supporting work thereon, a tool-holding device supported to be moved toward and away from the work, and means for moving said device toward and away from the work involving a rotatable, threaded, member threaded into said device, a second member rotatable with said first-named member, said members being relatively movable longitudinally, reversible clutch means one of the elements of which is operatively engaged with said second member, and automatically operating means for shifting said second member to effect reversal of the movement of said device.

88. The combination of a support, means for supporting work thereon, a tool-holding device supported to be moved toward and away from the work, and means for moving said device toward and away from the work involving a rotatable, threaded, member threaded into said device, a second member rotatable with said rotatable member, said members being relatively movable longitudinally thereof, a clutch operating when moved in one direction to effect the movement of said device toward the work and when moved in the opposite direction to effect the movement of said device away from the work, one of the elements of said clutch being operatively engaged with said second member, and means for shifting said second member to effect reversal of the movement of said device.

89. The combination of a support, means for supporting work thereon, a tool-holding device supported to be moved toward and away from the work, and means for moving said device toward and away from the work involving a rotatable, threaded, member threaded into said device, a second member rotatable with said first-named member, said members being relatively movable longitudinally, reversible clutch means one of the elements of which is operatively engaged with said second member, and means operated by said device in moving toward the work for shifting the said second member to effect reversal of the movement of said device.

90. The combination of a support, means for supporting work thereon, a tool-holding device supported to be moved toward and away from the work, and means for moving said device toward and away from the work involving a rotatable, threaded member threaded into said device, a second member rotatable with said first-named member, said members being relatively movable longitudinally, reversible clutch means one of the elements of which is operatively engaged with said second member, and means operated by said device in moving toward the work for shifting the said second member to effect reversal of the movement of said device, and in the movement of said device away from the work to cause said clutch device to be in neutral position.

91. The combination of a support, means for supporting work thereon, a tool-holding device supported to be moved toward and away from the work, and means for moving said device toward and away from the work involving rotating elements rotating in opposite directions, a second device having threaded engagement with said tool-holding device and through the medium of which the latter is actuated, and a clutch one element of which is carried by said second device operating when in one position to drive said second device from one of said rotating elements and when shifted to another position to drive said second device from the other of said rotating elements.

92. The combination of a support, means for supporting work thereon, a tool-holding device supported to be moved toward and away from the work, and means for moving said device toward and away from the work involving rotating elements rotating in opposite directions, a second device having threaded engagement with said tool-holding device and through the medium of which the latter is actuated, a clutch one element of which is carried by said second device operating when in one position to drive said second device from one of said rotating elements and when shifted to another position to drive said second device from the other of said rotating elements, and means operating automatically to shift said clutch to reverse the operation of said tool-holding device.

93. The combination of a support, means for supporting work thereon, a tool-holding device supported to be moved toward and away from the work, and means for moving said device toward and away from the work involving a rotatable, threaded, member having threaded engagement with said device, a second member telescoped with said rotatable member and rotatable therewith, said members being relatively movable longitudinally, mechanism for rotating said first-named member in either direction, by shifting said second member, and means operated by said device for shifting said second member.

94. The combination of a support, means for supporting work thereon, a tool-holding device supported to be moved toward and away from the work, and means for moving said device toward and away from the work involving a rotatable, threaded, member having threaded engagement with said device, a second member telescoped with said rotatable member and rotatable therewith, said members being relatively movable longitudinally, mechanism for rotating said first-named member in either direction, by shifting said second member, and means operated by said device for shifting said second member in opposite directions.

95. The combination of a support, means for supporting work thereon, a tool-holding device supported to be moved toward and away from the work, and means for moving said device toward and away from the work involving a rotatable, threaded, member having threaded engagement with said device, a second member rotatable with said first-named member, said members being relatively longitudinally movable, mechanism for rotating said first-named member in either direction, by shifting said second member, a power-storing mechanism operated by said device in the movement of the latter throughout a portion of its stroke and operating upon the movement of said device into a predetermined position to forcibly engage said second member and shift said first-named mechanism into a position for effecting reverse rotation of said first-named member.

96. In combination, a reciprocable device, a rotatable member having threaded engagement with said device for shifting the latter, a second member rotatable with said first-named member, said members being relatively movable longitudinally, means for rotating said second member the position of which is controlled by the shifting of said second member and operating when in one position to rotate said first-named member in one direction and when in another position to reverse rotation of said first-named member, said second member having a projection, a third member movable lengthwise of said second member and into the path of movement of which said projection extends, a spring through the medium of which said third member is shifted in the movement of said device in one direction, a catch normally restraining said third member in its movement toward said projection in the said movement of said device in which movement said spring becomes tensioned, and means operating automatically to release said catch from said third member when said device reaches a certain position to permit said third member to forcibly strike said projection and shift said second member, for the purpose set forth.

97. In combination, a reciprocable device, a rotatable member having threaded engagement with said device for shifting the latter, a second member rotatable with said first-named member, said members being relatively movable longitudinally, means for rotating said second member the position of which is controlled by the shifting of said second member and operating when in one position to rotate said first-named member in one direction and when in another position to reverse rotation of said first-named member, said second member having a projection, a third member movable lengthwise of said second member and into the path of movement of which said projection extends, a spring through the medium of which said third member is shifted in the movement of said device in one direction, a catch normally restraining said third member in its movement toward said projection in the said movement of said device in which movement said spring becomes tensioned, and means operated by said device when the latter reaches a predetermined position for releasing said catch to permit said third member to forcibly strike said projection and shift said second member, for the purpose set forth.

98. In combination, a reciprocable device, a rotatable member having threaded engagement with said device for shifting the latter, a second member rotatable with said first-named member, said members being relatively movable longitudinally, means for rotating said second member the position of which is controlled by the shifting of said second member and operating when in one position to rotate said first-named member in one direction and when in another position to reverse rotation of said first-named member, said second member having a projection, a third member movable lengthwise of said second member and into the path of movement of which said projection extends, a spring through the medium of which said third member is shifted in the movement of said device in one direction, a pivoted catch normally restraining said third member in its movement toward said projection in the said movement of said device in which movement said spring becomes tensioned, and means operating automatically to release said catch from said third member when said device reaches a certain position to permit said third member to forcibly strike said projection and shift said second member, for the purpose set forth.

99. In combination, a reciprocable member, a second, threaded, rotatable member having threaded engagement with said first-named member, a third member arranged in alined condition with said second member and rotatable therewith, said members being relatively movable longitudinally, and means controlled by the position of said third member operating when in one position to effect rotation of said second member in one direction and when in another position to effect rotation of the latter in the opposite direction.

100. In combination, a reciprocable member, a second, threaded, rotatable member having threaded engagement with said first-named member, a third member arranged in alined condition with said second member and rotatable therewith, said members being relatively movable longitudinally, means controlled by the position of said third member operating when in one position to effect rotation of said second member in one direction and when in another position to effect rotation of the latter in the opposite direction, and means operated by said first-named member for effecting the shifting of said third member to effect reversal of said second member.

101. In combination, a reciprocable member, a second, threaded, rotatable member having threaded engagement with said first-named member, a third member, means for rotating said second member operating when in one position to rotate said second member in one direction and when in another position to rotate it in the opposite direction, the position of said means being controlled by the position of said third member, and co-operating surfaces on said first-named member and said third member adapted to engage and shift said third member in the movement of said first-named member to a predetermined position for varying the position of said means, one of said surfaces being adjustable to vary the stroke of said first-named member.

102. In combination, a reciprocable member, a second rotatable member having threaded engagement with said first-named member, a third member arranged in alinement with said second member, a fourth member on said third member and provided with means for setting it to different positions along said third member, said means being formed of relatively adjustable sections, means for rotating said second member operating when in one position to effect rotation of said second member in one direction and when in another position to effect rotation of said second member in the opposite direction, controllable by the position of said third member, and means on said first-named member adapted to engage said projection for shifting said third member, for the purpose set forth.

103. In combination, a reciprocable member, a second rotatable member having threaded engagement with said first-named member, a third member telescoped with said second member and extending outwardly beyond the end of the latter and at which extending portion it is adapted to be grasped to be moved lengthwise in said second member, a fourth member on said third member and having a stem portion located within said third member and slidable lengthwise therein, said stem portion being formed of sections with an operative connection therebetween whereby when the outermost one of said sections which extends beyond the outer end of said third member is rotated, said fourth member is adjusted along said third member, means for rotating said second member operating when in one position to effect rotation of said second member in one direction and when in another position to effect rotation of said second member in the opposite direction, controllable by the position of said third member, and means on said first-named member adapted to engage said projection for shifting said third member, for the purpose set forth.

104. In combination, a support for work, a tool-holding device adapted to be moved toward and away from the work, a threaded, rotatable, shaft held against longitudinal movement and having threaded engagement with said device and operating when rotated in one direction to move said device in one direction and when rotated in the opposite direction to move said device in the opposite direction, a second tubular shaft telescoped with said first-named shaft and adapted to be moved lengthwise therein, said shafts being operatively connected to rotate together, clutch mechanism involving a clutch element carried by said second shaft and rotatable therewith, said element operating when in one position to effect drive of said second shaft in one direction and when moved into another position to effect drive of said second shaft in the opposite direction, a pair of projections carried by said second shaft and arranged in spaced relation along the latter, a rod located in said second shaft and connected with one of said projections, said rod being provided in sections relatively adjustable for effecting the adjustment of said last-referred-to projection along said second shaft, a sleeve surrounding said second shaft and shiftable along the latter and into the path of movement of which the other of said projections extends, a pivoted catch supported on a relatively stationary part and adapted in its normal position to interlock with said sleeve to prevent movement of the latter toward said last-referred-to projection, a spring interposed between said sleeve and said tool-holding device, said spring being so arranged as to become tensioned in the movement of said tool-holding device in one direction, and means on said device operating in the movement of the latter and after said spring has become tensioned, to disengage said catch from said sleeve and permit said spring to forcibly project said sleeve against said last-referred-to projection for shifting said clutch element into a position for reversing the rotation of said second shaft, said first-referred-to projection extending into the path of movement of said device in the movement of the latter produced by the reversal of the rotation of said second shaft as stated.

105. The combination of a support, means for supporting work thereon, a tool-holding device supported to be moved toward and away from the work, and means for moving said device including means for automatically arresting movement of said device in its movement in one direction involving a screw adjustment for varying the stroke of said device.

106. The combination of a support, means for supporting work thereon, a tool-holding device supported to be moved toward and away from the work, and means for moving said device toward and away from the work and including means for automatically reversing movement of said device in the said reversing movement involving a screw adjustment for varying the stroke of said device in its last-referred-to movement.

107. The combination of a support, means for supporting work thereon, a tool-holding device supported to be moved toward and away from the work, and means for moving said device including means for automatically arresting movement of said device in its movement in one direction involving a shiftable member adapted to be engaged by said device, and a threaded adjustment for setting said shiftable member in different positions to vary the stroke of the latter.

108. The combination of a support, means for supporting work thereon, a tool-holding device supported to be moved toward and away from the work, and means for moving said device including mechanism for producing reversal of movement of said device involving a shiftable member operating when shifted to effect such reversal, a spring positioned to shift said shiftable member in the movement of said device, means for releasably holding said shiftable member relative to said device for tensioning said spring, and means for releasing said last-named means.

109. The combination of a support, means for supporting work thereon, a tool-holding device supported to be moved toward and away from the work, and means for moving said device including mechanism for producing reversal of movement of said device involving clutch mechanism shiftable to effect the movement of said device in either direction, a shiftable member operating, when shifted, to shift said clutch mechanism to reverse the movement of said device, a spring positioned to shift said shiftable member in the movement of said device, means for releasably holding said shiftable member relative to said device for tensioning said spring, and means for releasing said last-named means.

110. The combination of a support, a member movable on said support, and means for moving said member on said support operating automatically to discontinue the movement of said member when the latter reaches a predetermined position, said means including a sectional shifter-element, and locking means arranged to automatically lock one section of said element against movement upon said member becoming positioned as stated, said other section of said element being movable by said member in the further movement of said member on said support in the direction in which it was moved by said first-named means.

111. The combination of a support, a member movable on said support, means for moving said member and involving a controlling element, and means for controlling said element comprising a shiftable member for operating said element and means operating automatically to shift said shiftable member to discontinue the movement of said first-named member when the latter reaches a predetermined position, said last-named means being constructed and arranged to permit the further movement of said first-named member on said support in the direction in which it was moved by said last-named means, after said last-named means have automatically discontinued the movement of said first-named member, without further movement of said controlling element.

112. The combination of a support, a member movable on said support, means for moving said member and involving a controlling element, and means for controlling said element comprising a shiftable member for operating said element and formed of sections relatively movable and a releasable connection therebetween, means operating automatically to shift said shiftable member to discontinue the movement of said first-named member when the latter reaches a predetermined position, said releasable connection permitting of the further movement in the same direction of said first-named member.

113. The combination of a support, a member movable on said support, means for moving said member and involving a controlling element, and means for controlling said element comprising a shiftable member for operating said element and formed of sections relatively movable and a releasable connection therebetween, means operating automatically to shift said shiftable member to discontinue the movement of said first-named member when the latter reaches a predetermined position, and means operating automatically to restrain the movement of the one of said sections of said shiftable member which operatively engages said element, when said first-named means reach said predetermined position, said releasable connection permitting of the further movement in the same direction of said first-named member.

114. The combination of a support, a member movable on said support, means for moving said member and involving a controlling element, and means for controlling said element comprising a shiftable member for operating said element and formed of sections relatively movable and a releasable connection therebetween, means operating automatically to shift said shiftable member to discontinue the movement of said first-named member when the latter reaches a predetermined position, said releasable connection permitting of the further movement in the same direction of said first-named member, and being constructed and arranged to again releasably lock said sections together in the movement of said first-named member in the reverse direction.

115. The combination of a support, a member movable on said support, and means for moving said member on said support operating automatically to discontinue the movement of said member when the latter reaches predetermined positions at the ends of its strokes in opposite directions, said means being constructed and arranged to permit of further movement of said member on said support in its movement in one direction, in the direction in which it was moved by said means, after said means have automatically discontinued the movement of said member.

116. The combination of a support, a member movable on said support, means for moving said member in opposite directions and including a controlling element, a sectional shifter element one of the sections of which operatively engages said controlling element, releasable means connecting said sections together, tappets on said shifter element adapted to be engaged by said member in its movement in opposite directions for shifting said shifter element as a unit, and means restraining movement of the one of said sections of said shifter element which operatively engages said controlling element, upon the movement of said shifter element to a position in which the movement of said member is arrested, said releasable connection permitting said member to continue its movement for further adjustment thereof following the discontinuation of the movement of said member by said first-named means in one direction.

117. The combination of a support, a member movable on said support, means for moving said member in opposite directions and including a controlling element, a sectional shifter element one of the sections of which operatively engages said controlling element, releasable means connecting said sections together, tappets on said shifter element adapted to be engaged by said member in its movement in opposite directions for shifting said shifter element as a unit, and means restraining movement of the one of said sections of said shifter element which operatively engages said controlling element, upon the movement of said shifter element to a position in which the movement of said member is arrested, said releasable connection permitting said member to continue its movement for further adjustment thereof following the discontinuation of the movement of said member by said first-named means in one direction.

118. The combination of a support, a pair of work-holding members movable toward and away from each other on said support, means for moving said members relative to each other operating automatically to discontinue the movement of said members when the latter reach a predetermined position, said means being constructed and arranged to permit of further movement of said members relative to each other on said support in the directions in which they were moved by said means, after said means have automatically discontinued the movement of said members.

119. The combination of a support, a member movable on said support, and means for moving said member on said support operating automatically to discontinue the movement of said member when the latter reaches a predetermined position, said means including a sectional shifter element, means yieldingly connecting said sections together for movement by said member, and means arranged to automatically hold one of said sections against movement upon said member becoming positioned as stated, said other section of said element being movable by said member in the further movement of said member on said support in the direction in which it was moved by said first-named means, said yielding means yielding to permit relative movement of said sections.

120. In a machine of the character set forth, the combination of a support, a pair of members supported thereon and movable toward and away from each other, means operatively connected with said members for moving said members toward and away from each other, and means operating automatically to discontinue the movement of each of said members in both directions, when they reach predetermined positions.

121. The combination of a support, means for supporting work thereon, a tool-holding device supported to be moved toward and away from the work, and means for moving said device toward and away from the work involving a rotatable, threaded, member threaded into said device, a second member, said members being relatively movable longitudinally, mechanism operating when in one position to rotate said first-named member in one direction and when in another position to rotate it in the opposite direction, said mechanism being controlled by the position of said second member, and means for shifting said second member to effect reversal of the movement of said device.

122. The combination of a support, means for supporting work thereon, a tool-holding device supported to be moved toward and away from the work, and means for moving said device toward and away from the work involving a rotatable, threaded, member threaded into said device, a second member, said members being relatively movable longitudinally, clutch means one of the elements of which is carried by said second member, and means for shifting said second member to effect reversal of the movement of said device.

123. The combination of a support, means for supporting work thereon, a tool-holding device supported to be moved toward and away from the work, and means for moving said device toward and away from the work involving a rotatable, threaded, member threaded into said device, a second member, said members being relatively movable longitudinally, clutch means one of the elements of which is operatively engaged with said second member, and automatically operating means for shifting said second member to effect reversal of the movement of said device.

124. The combination of a support, means for supporting work thereon, a tool-holding device supported to be moved toward and away from the work, and means for moving said device toward and away from the work involving a rotatable, threaded, member threaded into said device, a second member, said members being relatively movable longitudinally thereof, a clutch operating when moved in one direction to effect the movement of said device toward the work and when moved in the opposite direction to effect the movement of said device away from the work, one of the elements of said clutch being operatively engaged with said second member, and means for shifting said second member to effect reversal of the movement of said device.

125. The combination of a support, means for supporting work thereon, a tool-holding device supported to be moved toward and away from the work, and means for moving said device toward and away from the work involving a rotatable, threaded member threaded into said device, a second member, said members being relatively movable longitudinally, clutch means one of the elements of which is operatively engaged with said second member, and means operated by said device in moving toward the work for shifting the said second member to effect reversal of the movement of said device.

126. The combination of a support, means for supporting work thereon, a tool-holding device supported to be moved toward and away from the work, and means for moving said device toward and away from the work involving a rotatable, threaded member threaded into said device, a second member, said members being relatively movable longitudinally, clutch means one of the elements of which is operatively engaged with said second member, and means operated by said device in moving toward the work for shifting the said second member to effect reversal of the movement of said device, and in the movement of said device away from the work to cause said clutch device to be in neutral position.

127. The combination of a support, means for supporting work thereon, a tool-holding device supported to be moved toward and away from the work, and means for moving said device toward and away from the work involving a rotatable, threaded, member having threaded engagement with said device, a second member telescoped with said rotatable member, said members being relatively movable longitudinally, mechanism for rotating said first-named member shiftable, for rotating the latter in either direction, by shifting said second member, and means operated by said device for shifting said second member.

128. The combination of a support, means for supporting work thereon, a tool-holding device supported to be moved toward and away from the work, and means for moving said device toward and away from the work involving a rotatable, threaded, member having threaded engagement with said device, a second member telescoped with said rotatable member, said members being relatively movable longitudinally, mechanism for rotating said first-named member shiftable, for rotating the latter in either direction, by shifting said second member, and means operated by said device for shifting said second member in opposite directions.

129. The combination of a support, means for supporting work thereon, a tool-holding device supported to be moved toward and away from the work, and means for moving said device toward and away from the work involving a rotatable, threaded, member having threaded engagement with said device, a second member, said members being relatively longitudinally movable, mechanism for rotating said first-named member shiftable, for rotating the latter in either direction, by shifting said second member, a power-storing mechanism operated by said device in the movement of the latter throughout a portion of its stroke and operating upon the movement of said device into a predetermined position to forcibly engage said second member and shift said first-named mechanism into a position for effecting reverse rotation of said first-named member.

130. In combination, a reciprocable device, a rotatable member having threaded engagement with said device for shifting the latter, a second member, said members being relatively movable longitudinally, means for rotating said first-named member the position of which is controlled by the shifting of said second member and operating when in one position to rotate said first-named member in one direction and when in another position to reverse rotation of said first-named member, said second member having a projection, a third member movable lengthwise of said second member and into the path of movement of which said projection extends, a spring through the medium of which said third member is shifted in the movement of said device in one direction, a catch normally restraining said third member in its movement toward said projection in the said movement of said device in which movement said spring becomes tensioned, and means operating automatically to release said catch from said third member when said device reaches a certain position to permit said third member to forcibly strike said projection and shift said second member, for the purpose set forth.

131. In combination, a reciprocable device, a rotatable member having threaded engagement with said device for shifting the latter, a second member, said members being relatively movable longitudinally, means for rotating said first-named member the position of which is controlled by the shifting of said second member and operating when in one position to rotate said first-named member in one direction and when in another position to reverse rotation of said first-named member, said second member having a projection, a third member movable lengthwise of said second member and into the path of movement of which said third member is shiftable in the movement of said device in one direction, a catch normally restraining said third member in its movement toward said projection in the said movement of said device in which movement said spring becomes tensioned, and means operated by said device when the latter reaches a predetermined position for releasing said catch to permit said third member to forcibly strike said projection and shift said second member, for the purpose set forth.

132. In combination, a reciprocable device, a rotatable member having threaded engagement with said device for shifting the latter, a second member, said members being relatively movable longitudinally, means for rotating said first-named member the position of which is controlled by the shifting of said second member and operating when in one position to rotate said first-named member in one direction and when in another position to reverse rotation of said first-named member, said second member having a projection, a third member movable lengthwise of said second member and into the path of movement of which said projection extends, a spring through the medium of which said third member is shifted in the movement of said device in one direction, a pivoted catch normally restraining said third member in its movement toward said projection in the said movement of said device in which movement said spring becomes tensioned, and means operating automatically to release said catch from said third member when said device reaches a certain position to permit said third member to forcibly strike said projection and shift said second member, for the purpose set forth.

133. In combination, a reciprocable member, a second, threaded, rotatable member having threaded engagement with said first-named member, a third member arranged in alined condition with said second member, said members being relatively movable longitudinally, and means controlled by the position of said third member operating when in one position to effect rotation of said second member in one direction and when in another position to effect rotation of the latter in the opposite direction.

134. In combination, a reciprocable member, a second, threaded rotatable member having threaded engagement with said first-named member, a third member arranged in alined condition with said second member, said members being relatively movable longitudinally, means controlled by the position of said third member operating when in one position to effect rotation of said second member in one direction and when in another position to effect rotation of the latter in the opposite direction, and means operated by said first-named member for effecting the shifting of said third member to effect reversal of said second member.

ALBERT H. SEGLER.